US011218376B2

(12) United States Patent
Jain et al.

(10) Patent No.: US 11,218,376 B2
(45) Date of Patent: Jan. 4, 2022

(54) ALGORITHMIC PROBLEM IDENTIFICATION AND RESOLUTION IN FABRIC NETWORKS BY SOFTWARE DEFINED OPERATIONS, ADMINISTRATION, AND MAINTENANCE

(71) Applicant: Cisco Technology, Inc., San Jose, CA (US)

(72) Inventors: Prakash C. Jain, Fremont, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/373,421

(22) Filed: Apr. 2, 2019

(65) Prior Publication Data

US 2020/0162337 A1    May 21, 2020

Related U.S. Application Data

(60) Provisional application No. 62/768,184, filed on Nov. 16, 2018.

(51) Int. Cl.
*H04L 12/24*        (2006.01)
*H04L 12/26*        (2006.01)

(52) U.S. Cl.
CPC .............. *H04L 41/14* (2013.01); *H04L 41/12* (2013.01); *H04L 41/20* (2013.01); *H04L 41/50* (2013.01); *H04L 43/08* (2013.01)

(58) Field of Classification Search
CPC .............. G06F 11/079; G06F 11/0793; G06F 11/0751; H04L 41/12; H04L 41/0631; H04L 41/142; H04L 41/20; H04L 41/50; H04L 43/08; H04L 63/1425; H04L 41/14
See application file for complete search history.

(56) References Cited

U.S. PATENT DOCUMENTS

| | | | |
|---|---|---|---|
| 8,341,590 B1 * | 12/2012 | Poole | G06F 8/71 717/101 |
| 8,990,290 B1 * | 3/2015 | Mikkilineni | G06F 9/54 709/203 |
| 9,262,180 B2 * | 2/2016 | Menon | G06F 9/453 |
| 9,356,871 B2 | 5/2016 | Medved et al. | |
| 9,588,815 B1 * | 3/2017 | Mistry | G06F 11/3452 |
| 9,659,251 B2 | 5/2017 | Tang et al. | |
| 9,680,698 B2 | 6/2017 | John et al. | |
| 10,027,530 B2 * | 7/2018 | Mahkonen | H04L 43/0829 |
| 10,320,691 B1 * | 6/2019 | Matthews | H04L 45/121 |
| 11,048,979 B1 * | 6/2021 | Zhdanov | G06K 9/6257 |
| 2003/0126254 A1 * | 7/2003 | Cruickshank, III | H04L 41/00 709/224 |

(Continued)

OTHER PUBLICATIONS

"Real-time Analytics, Assurance and Optimization Using Hybrid and Virtualized Solutions," available at www.viavisolutions.com, page accessed on Dec. 20, 2018, 14 pages.

(Continued)

*Primary Examiner* — Shean Tokuta
(74) *Attorney, Agent, or Firm* — Polsinelli PC

(57) ABSTRACT

Systems and methods provide for algorithmic problem identification and resolution in fabric networks by software defined operation, administration, and maintenance.

20 Claims, 17 Drawing Sheets

(56) References Cited

U.S. PATENT DOCUMENTS

| | | | | |
|---|---|---|---|---|
| 2007/0174693 | A1* | 7/2007 | Gerber | G06F 11/0793 |
| | | | | 714/15 |
| 2008/0008102 | A1* | 1/2008 | Bardalai | H04L 43/10 |
| | | | | 370/242 |
| 2008/0126283 | A1* | 5/2008 | Odom | G06F 11/2252 |
| | | | | 706/45 |
| 2010/0131792 | A1* | 5/2010 | Herrod | G06F 11/0748 |
| | | | | 714/2 |
| 2011/0179058 | A1* | 7/2011 | Purcell | G06Q 10/103 |
| | | | | 707/769 |
| 2012/0185775 | A1* | 7/2012 | Clemm | G06F 11/3466 |
| | | | | 715/734 |
| 2012/0254291 | A1* | 10/2012 | Feldman | G06Q 10/06 |
| | | | | 709/203 |
| 2015/0012141 | A1* | 1/2015 | Schulz | G05B 11/01 |
| | | | | 700/275 |
| 2015/0319050 | A1 | 11/2015 | Kasturi et al. | |
| 2016/0254968 | A1* | 9/2016 | Ebtekar | H04L 41/12 |
| | | | | 709/223 |
| 2016/0274961 | A1* | 9/2016 | Thomas | G06F 40/30 |
| 2017/0155544 | A1 | 6/2017 | Khanna et al. | |
| 2018/0060159 | A1* | 3/2018 | Justin | G06F 11/0787 |
| 2018/0284735 | A1* | 10/2018 | Cella | G06N 3/02 |
| 2018/0285204 | A1* | 10/2018 | Dwarampudi | G06F 11/3055 |
| 2018/0343238 | A1* | 11/2018 | Tola | H04L 9/14 |
| 2019/0034254 | A1* | 1/2019 | Nataraj | G06F 11/079 |
| 2019/0068619 | A1* | 2/2019 | Fan | H04L 63/1416 |
| 2019/0147655 | A1* | 5/2019 | Galera | G05B 19/4061 |
| | | | | 345/419 |
| 2019/0199746 | A1* | 6/2019 | Doron | H04L 63/1458 |
| 2020/0036624 | A1* | 1/2020 | Michael | H04L 43/0876 |
| 2020/0067952 | A1* | 2/2020 | Deaguero | G06F 21/552 |
| 2020/0162337 | A1* | 5/2020 | Jain | H04L 41/20 |
| 2021/0006628 | A1* | 1/2021 | Pai | H04L 67/16 |

OTHER PUBLICATIONS

International Search Report and Written Opinion from the International Searching Authority, dated Jan. 17, 2020, 12 pages, for corresponding International Patent Application No. PCT/US2019/059879.

* cited by examiner

ALGORITHMIC PROBLEM IDENTIFICATION AND RESOLUTION IN FABRIC NETWORKS BY SOFTWARE DEFINED OPERATIONS, ADMINISTRATION, AND MAINTENANCE

CROSS-REFERENCE

This application is related to and claims priority under 35 U.S.C. § 119(e) from U.S. Patent Appl. No. 62/768,184, filed Nov. 16, 2018 entitled "ALGORITHMIC PROBLEM IDENTIFICATION AND RESOLUTION IN FABRIC NETWORKS BY SOFTWARE DEFINED OPERATIONS, ADMINISTRATION, AND MAINTENANCE," the entire contents of each of which is incorporated herein by reference for all purposes.

TECHNICAL FIELD

The subject matter of this disclosure relates in general to the field of computer networking, and more particularly, to systems and methods for improving the operation of an enterprise network.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
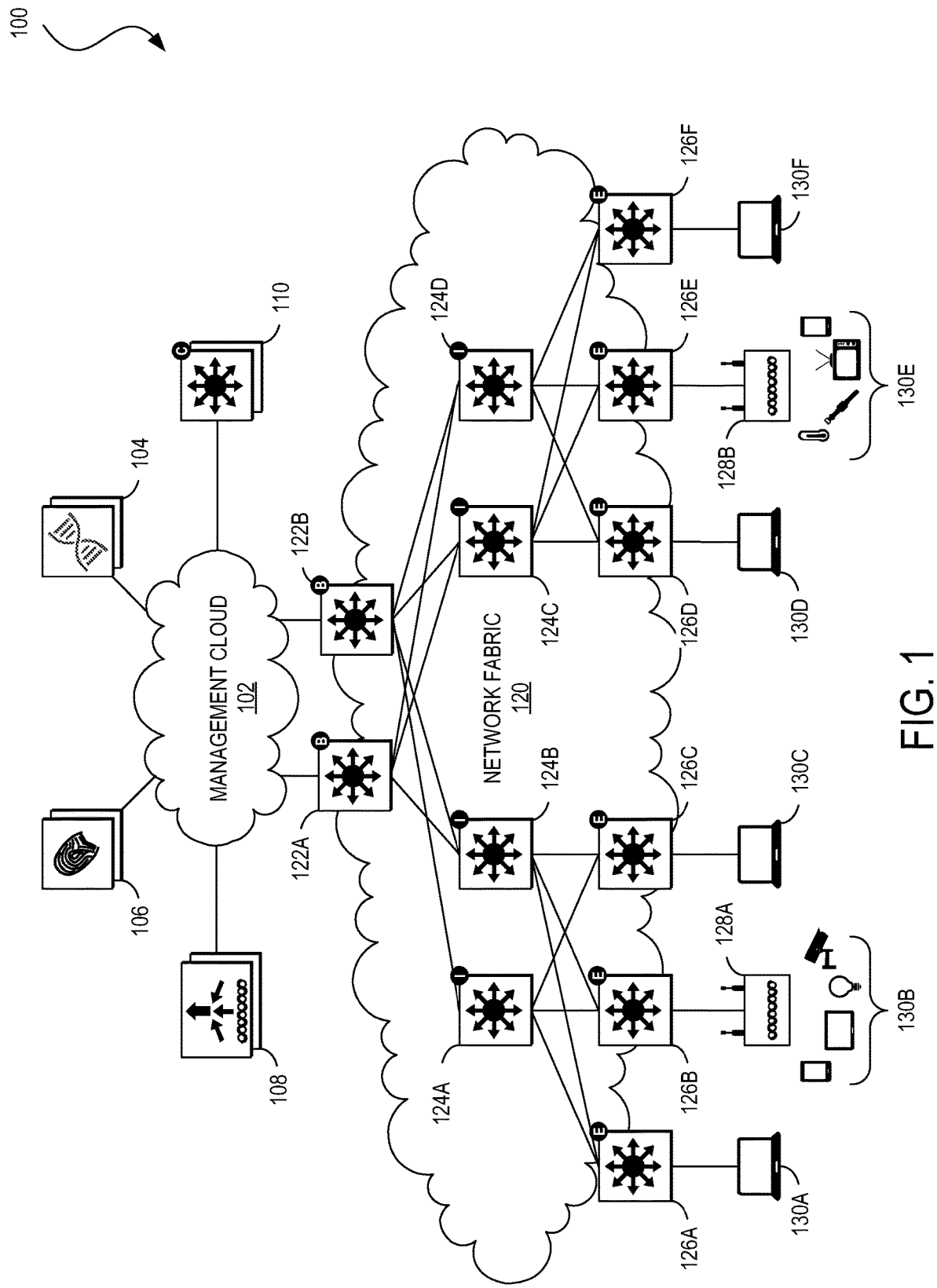
FIG. 1 illustrates an example of a physical topology of an enterprise network in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for software defined operations, administration, and maintenance (SD-OAM) for an enterprise network. Software defined service assurance points (SD-SAPs) can be installed at device nodes of a networking device, which may be a component of a network (e.g., an enterprise network). Each SD-SAP can trigger and/or collect local status, statistics, debug logs and traces, and analytics on each respective device node. Each SD-SAP may be in communication with a controller (e.g., DNA-C), which can trigger, collect, or coordinate local analytics of a device node through the respective SD-SAP. The controller may additionally trigger automated workflows for service assurance based on local analytics received by the controller.

In at least some aspects, an example method, system, or computer-readable storage medium can receive, at a controller, node analytics from a service assurance point (SAP). The node analytics can include performance information of a node within an access network of which the node is a part. The controller can then trigger an intent specific workflow at a workflow application based on the node analytics and monitor the node by receiving additional node analytics.

EXAMPLE EMBODIMENTS

As fabric technologies service large and increasing numbers of devices at scale and with seamless mobility, operation, administration, and maintenance (OAM) of the associated networks becomes increasingly complex and convoluted. Complex networks, such as Enterprise fabric overlay networks for example, can be maintained by operations, administration, and maintenance (OAM) system. OAM systems can assist in quickly resolving connectivity, performance, and/or assurance issues in respective networks. In some examples, OAM systems may be augmented to perform detection and resolution activities automatically and on a learned and/or self-healing basis. Further, in order to successfully transition a traditional private (e.g., enterprise, etc.) network into a fabric based software defined access (SD-Access) network, OAM and assurance systems must have robust and granular capabilities.

Software defined OAM (SD-OAM) solutions can provide next generation OAM and/or assurance for software defined access networks by automatically identifying problems and running related hierarchical workflows for identification and resolution (e.g., automated troubleshooting).

Inexperienced and/or new workforce or loss of knowledge over time can cause maintenance and/or debugging of an OAM system to be time consuming and expensive. However, in some examples, an OAM system can learn workflows associated with particular issues and apply the learned workflows automatically upon issue detection. In effect, the OAM system may build a library of automated solutions over time from field experiences (e.g., such as during complex cross domain problem resolutions).

SD-Access networks may involve different type of nodes (e.g., edge switches, border routers, access points (APs), wireless controllers (WLCs), control plane server devices, etc.) as well as different types of connectivity (e.g., underlay links, overlay tunnels, etc.). A comprehensive OAM system may provide end to end network monitoring, fault detection and/or correction, and service assurance by using software define service assurance points (SAPs) spread throughout a serviced network.

OAM mechanisms may also provide end-to-end data plane connectivity monitoring and fault detection in networks by sending OAM packets from one end to another. For example, OAM mechanisms may be used to monitor and/or enforce (e.g., via self-correction, etc.) compliance with service level agreements (SLAs) such as service up time, latency, bandwidth, etc. OAM mechanisms can collect maintenance data at various devices as the OAM packets traverse the network and respective devices reply to and with OAM packets containing maintenance data collected at intermediate nodes or endpoints. Additionally, OAM may receive back OAM response packets via the origin node. The OAM response packets may include data from intermediate and/or end devices in the path. The resultant data (from either or both of the OAM packet traversals) can then be used to calculate health statistics, generate alarms for fault or monitoring status, and identify ongoing to emerging problems within the respective network. Further, in some examples, multiple (e.g., redundant) alarms for a single failure may occur as a result of no or minimal coordination between device reports. In comparison, a distribution of SAPs across the network can provide coordinate data to the OAM and so protect against unnecessary and/or potentially false (e.g., receiving a redundant alert after an issue has been resolved) alerts that would otherwise consume time and resources in resolving.

Some "out of band" OAM mechanisms include "ping and traceroute" operations which include targeting an address and aggregating timing and location information along the route to the targeted address. In some examples, in order to reduce the large number of packets created by ping and traceroute operations, an OAM service including SAPs distributed within the network may retrieve information directly from adjacent SAPs along a path and aggregate the data from the adjacent SAPs in order to provide a complete picture of the network and any faults without flooding the network with traceroutes spanning the endpoint to endpoint.

In-band OAM (IOAM) mechanisms may modify actual traffic by pre-pending OAM context in the packet header, at each transit node. However, as the packet size increases at each hop, IOAM often introduces new maximum transmission unit (MTU) size requirements on the network due to including increasingly more information in the respective packet. In comparison, SAPs make no alteration to packet size due to transmitting OAM packets directly to a target and/or the controller. In effect, IOAM using SAPs can substantially or entirely avoid modifying MTU size requirements.

In some examples, SDA may build a fabric network across multiple transit networks. For example, enterprise SDA networks can involve various types of devices spanning multiple non-homogeneous sites across virtual routing and forwarding services (VRFs), across multiple sites administered by different operators and controllers using different technologies (e.g., multiprotocol label switching (MPLS) pseudo-wires, wireless access networks (WANs), border gateway protocols (BGPs), Ethernet virtual private networks (eVPNs), L2/L3 tunnels, etc.) and interconnections with data centers and/or service clouds. OAM protocols used for service monitoring across multiple technology sites and transit networks are often different. For example, many devices do not support IOAM, such as in switching infrastructures, and so an end-to-end path (e.g., for retrieving OAM data across the network) may include a segment lacking support for OAM functionality. However, SAPs may be installed at each device location and SAP data may be used to generate OAM data and/or convert non-standard OAM data into a single format usable by an OAM service or a network controller.

In addition to the above features, SD-OAM can account for dynamic network traffic flows by using installed SAPs and without depending on a collocated or remote control plane to determine data paths through the network topology. In effect, OAM packet paths can change with shifting data paths in order to provide connectivity and fault detection for particular traffic flows without causing bandwidth or scaling and performance issues on network or endpoint devices.

SD-OAM can achieve network operations, administration, and maintenance utilities, connectivity and fault monitoring, performance measurements, assurance, ability to perform granular debugging, increased serviceability, and automated correction and repair (e.g., self-healing, etc.) features by using distributed SAPs. Further, SD-OAM may minimize or entirely negate resource issues (e.g., bottlenecks, slowdowns, scalability, etc.) for nodes on network paths of interest.

SD-OAM may work in coordination with a network controller (e.g., a controller which provisions and manages devices in a SDA fabric), a fabric control plane, and/or other controllers to provide end-to-end network monitoring. For example, and without imputing limitation, SD-OAM may provide monitoring of a substantial proportion of mobile end points and for different types of network devices, monitoring across nonhomogeneous sites or different VRFs, monitoring of different types of connectivity (e.g., underlay, overlay, wired, wireless, extranet, multisite, etc.), monitoring of an integrated control plane, and/or network maintenance by less experienced workforce having cross domain knowledge, etc.

SD-OAM may be optimized by using a network topology received from a network controller during network deployment. Based on the topology, probes (e.g., SAP installations) can be deployed (on demand or a priori) to network nodes and elements based on value and usefulness provided by the installation point.

Additionally, SD-OAM can use can match network issues to workflows in a database of hierarchical OAM workflows for detection and correction of issues. In some examples, the database of workflows may be expanded over time based on recording manual detection and repair workflows. The hierarchical workflows can be run using on the deployed SAPs, which may also collect and provide local analytics.

A network controller may record the topology of a respective complete end-to-end network (e.g., a private or enterprise network, etc.) across the multiple sites and multiple VRFs. The topology may include connections to shared services (e.g., identification and/or authorization services, data storage services, hosted software services, etc.), wide area networks (WANs), data centers, etc. A SDA or fabric control plane and wireless controller (WLC) may store identity and location information of all hosts (e.g., endpoint devices) across the multiple sites and VRFs (e.g., behind which site, VRF, edge connection, and access point (AP) node each host exists). The SDA control plane (e.g., a map-server and map-resolver (MSMR) device or service) and WLC may retrieve the above topological information via dynamic learning (e.g., auto-discovery) and/or policy configuration (e.g., manually provided lists of hosts, sites, extranets, or multi-site policies on MSMR, etc.). SD-OAM can leverage the topological knowledge provided by the network controller, SDA control plane, and/or WLC. Accordingly, each SAP only needs to send OAM packets to its immediate neighbor (e.g., not a full end-to-end traversal) for scalable connectivity fault detection and performance monitoring. The network controller can then generate an end-to-end monitoring result (e.g., report, analytics, downstream service calls, etc.) using the topology and aggregated SAP data across various segments of the network.

In some examples, detection of anomalies (e.g., faults, etc.) locally at a SAP may automatically trigger detection and solution workflows, such as debug logs, serviceability data reports, and telemetry data. The workflow outputs may also or instead the network controller as needed. In effect, SD-OAM can integrate with a network controller, a WLC, and/or a fabric control plane to aggregate information from SAPs distributed across the network on different devices (e.g., nodes), including devices across non-homogeneous sites, to provide end-to-end network monitoring, fault detection, and auto-correction.

In particular, SD-OAM may include SAPs located at device nodes (e.g., to trigger and collect local status, statistics, debug logs, traces, and analytics on the respective device), an infrastructure (e.g., within SD-OAM) to activate and coordinate the SAPs to collect local network information (e.g., analytics) and to aggregate the returned data into a cohesive picture of the global network (or of the segments of interest), and an intent specific workflow process to provide automated service assurance based on the cohesive network picture generated by the network controller. Furthermore, SD-OAM and the SAPs may communicate in order to perform coordination and deduplication processes for of SAP information (e.g., to avoid export of redundant data). SAP information can be provided to network controllers using, for example, YANG data models. Additionally, the intent specific workflow(s) can be triggered by the network controller through a northbound REST interface (e.g., via API call, etc.).

In some examples, the SAPs can be software defined systems (e.g., SD-SAPs) and may include communication channels with the SD-OAM infrastructure. The SD-SAPs may be generated and installed when a network controller (e.g., for a respective network) provisions a dynamic endpoint subnet. The SD-SAP can be installed onto and configured for the provisioned dynamic endpoint subnet or for each node included in the subnet (or per virtual network, security group tag (SGT), etc. based on a desired monitoring granularity). In addition, SD-SAPs may be installed to fabric-edge and border nodes and these SD-SAPs may assist in generating network information for multiple site and/or nonhomogeneous networks.

The SD-SAPs can collect local network information (e.g., along segments between immediately neighboring nodes) and report various connectivity, health, performance, and resource (e.g., map-caches, DHCP pool addresses, etc.) data to the network controller. The parameters can include, for example and without imputing limitation, underlay and overlay data path status and statistics, underlay and overlay control plane status and statistics, and host on-boarding information (e.g., connectivity, link status, etc.). Furthermore, the SD-SAPs can perform local processes (e.g., local correlations generated on node, etc.) to determine network information which may be provided with, or rather than, unprocessed local network information to the network controller. In some examples, local correlations from various SD-SAPs can be combined to produce global correlations, or network information across the network, at the controller (e.g., via SD-OAM, etc.).

Each SD-SAP may be assigned a unique IP address from a respective configured dynamic endpoint subnet. In some examples, each SD-SAP can instead be assigned a universal multiple VRF IP address. The assigned IP address can then be used as a source identifier for sending OAM packets to neighbor SD-SAPs (e.g., installed on neighboring nodes) for generating underlay, overlay, and/or control plane network information.

The SD-OAM infrastructure can be provisioned as part of the SD-OAM architecture and may be available to additional system features and components. In some examples, system administrators may use the SD-OAM infrastructure write custom OAM, debugging, and/or serviceability workflows. The custom workflows may be assigned to other workflows within a system hierarchy and can be triggered according to the hierarchy. As a result, the SD-OAM infrastructure can perform any provided workflow according to provided rules. In other words, SD-OAM infrastructure may be decoupled from the workflows themselves. Workflows can be added, enhanced, and updated in a workflow database over time and based on automatic learning (e.g., recording and reproduction) without directly impacting the SD-OAM infrastructure service itself.

In one aspect, workflows can be thought of as step-by-step commands provided as an SD-OAM application or script running on a SD-OAM ecosystem. Workflows may be modular from a functionality point of view. Further, based on the hierarchical system, one workflow can trigger another workflow based on the result from parent workflow. A hierarchy of steps in a particular workflow and/or the nesting of individual workflows can be different based on intent (e.g., deployment or trouble shooting).

A hierarchical workflow database can be populated and updated over time as follows:

For new system feature introductions and/or development, each new feature deployment may include manually adding an associated debugging or assurance workflow.

For system or solution testing, each system or solution test which finds an issue can be manually or automatically added as an assurance workflow to help in saving time in resolving the same issue in field.

For learning from deployments, each issue found through a customer deployment can be added as an assurance workflow to help in saving time in resolving the same issue next time.

For customer problem(s) resolution(s), each customer found bug can be added as an assurance workflow to help in saving time in resolving the same issue with another customer.

As a result, the SD-OAM architecture may continuously learn and update workflows as new customer deployments progress and experience is accrued resolving issues (e.g., OAM knowledge base learns over time). The new and updated workflows can later be automatically triggered by automatically matching substantially similar problems to problems mapped to the saved workflows, and thus enabling SDA networks to auto correct (e.g., self-heal).

In some examples, SD-OAM can span nonhomogeneous sites with integrated fabric control planes. A centralized fabric control and forwarding plane, via SDA, may support shared services and extranet as well as multiple site connectivity. SD-SAPs can leverage the centralized fabric control and forwarding plane to collect OAM data for sites across VNs (e.g., extranets) and multiple site network architectures. SD-SAPs can utilize proprietary data in protocol messages to exchange information across or between different VRFs and/or inter-site traffic with a centralized (e.g., SDA) fabric control plane. In particular the SD-OAM may perform the following steps:

1) SD-SAPs may leverage existing OAM mechanisms and protocols of different technologies within different sites. For example, and without imputing limitation, a SD-SAP could use L3 BFD, L2 CFM/Y.1731, or ICMP IP-SLA probe packet types to perform underlay connectivity and/or fault detection according to the underlay type (e.g., L2 or L3) of the respective site. Alternatively, SD-SAPs can leverage an IOAM system to check and/or monitor connectivity of a site or transmission network to respective border and peer edges as well as underlay next hops for devices in the sites supporting the IOAM system. In other examples, SD-SAPs can also use a nv03 OAM mechanism to generate overlay connectivity information.

2) In the sites where no existing OAM protocol can be leveraged, SD-SAPs may originate ICMP packets for OAM purposes. The ICMP packets may be transmitted via a tunnel (e.g., VxLAN) or native means as required by links for monitoring and performance measurements.

3) Each SD-SAP may monitor and/or detect connectivity, fault, performance, delay, packet loss, etc. with only its peer(s) within a site (e.g., local measurements). The network controller may then utilize a map of the network topology to retrieve local measurements from each SD-SAP on each node per the technology available to each respective node. Each SD-SAP may then format and structure the local measurements into a standard format to send back to the controller.

In some examples, such as between on a border between nonhomogeneous sites, SD-SAPs can provide inter-OAM information (e.g., between two different domains served by two different OAM technologies). In particular, the SD-OAM can perform the following steps:

A. SD-SAPs may convert and normalize OAM data collected from different OAM protocols from multiple nonhomogeneous sites into a well-defined SD-OAM data record format sent to the network controller to form a complete end to end view. As a result, SD-OAM can avoid complex conversion or inter-working function from one OAM technology to another at site borders.

B. The network controller may then use the information collected by the SD-SAPs to generate an end-end analysis of a network or segments with the network. The analysis can then be provided to service assurance.

However, in cases of nonhomogeneous sites managed by different controllers, for example between SDA and ACI sites, SD-OAM may perform two additional processes.

C. Destination prefixes imported from another site can be labeled (e.g., marked with a color code, etc.). For example, ACI routes may be labeled as ACI and SDA routes as SDA. SD-SAPs at the border of each of the sites (SDA and ACI) can send OAM packets towards the destination prefixes of another domain to check and/or monitor connectivity across domains. For aggregated prefixes, respective network controllers can provide a SD-SAP address for the targeted prefix/subnet to run a respective OAM protocol. As a result, the SDA border runs a respective OAM protocol towards SD-SAPs (e.g., prefixes) in the ACI and the ACI border runs respective OAM protocols towards the SD-SAPs (e.g., labeled prefixes) in the SDA site. Accordingly, cross domain visibility can be achieved by each of the border SD-SAPs for each respective domain. Border SD-SAPs can report to respective controllers without impacting performance inside the respective domains with OAM packets sent to destinations of another domain.

Furthermore, controllers of nonhomogeneous sites may use a same common SD-OAM record format to exchange telemetry, analytics, and other OAM data between the controllers. The shared SD-OAM record format can be used to form an end-to-end view for service assurance across the nonhomogeneous domains at each controller. Each of the controllers can also use the shared SD-OAM record format to communicate network visibility at the controller level. Exchanged information (including SD-SAPs of each side) can be used by respective domain controllers to perform endpoints and/or border nodes to run on-demand end-to-end OAM protocol workflows towards other domain endpoints. In effect, service and connectivity in the presence of local policies (e.g., ACLs) along a path can be assured.

The network controller can use the information received from the SD-SAPs to instruct SD-SAPs to take corrective action in the network as issues are identified. For example, the network controller can decide to switch a particular fabric control plane to an alternate control plane for a particular site, a default border to an alternate default border to send traffic via an alternate site, etc.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
|---|---|
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:
  An intent-based network can learn the performance needs of applications and services and adapt the network from end-to-end to achieve specified service levels;
  Instead of sending technicians to every office, floor, building, or branch, an intent-based network can discover and identify devices and things as they connect, assign security and micro-segmentation profiles according to established policies, and continuously monitor access point performance to automatically adjust for QoE;
  Users can move freely among network segments, mobile device in hand, and automatically connect with the correct security and access privileges;
  Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and
  Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can include one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106. Further, in some embodiments, a software defined service assurance process (SD-SAP) may be installed, for example, to ISE appliances.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/ fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108. In some embodiments, WLC(s) 108 may include and/or be associated with a SD-SAP (discussed below).

The network fabric 120 can include fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may include a dedicated node or set of nodes or the functionality of the fabric control node(s) 110 may be implemented by the fabric border nodes 122. In some embodiments, a SD-SAP may be installed to any or all of the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
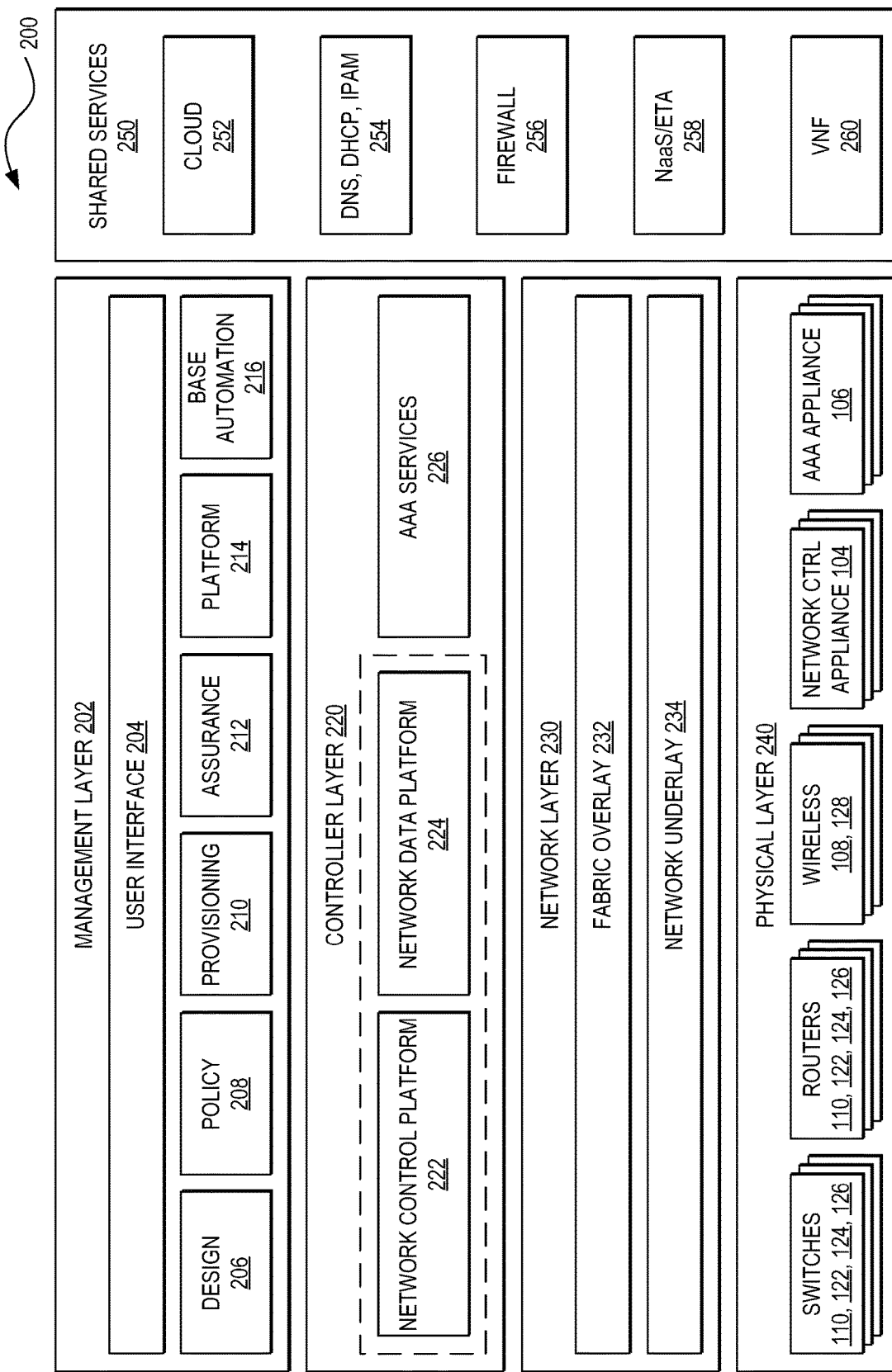
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
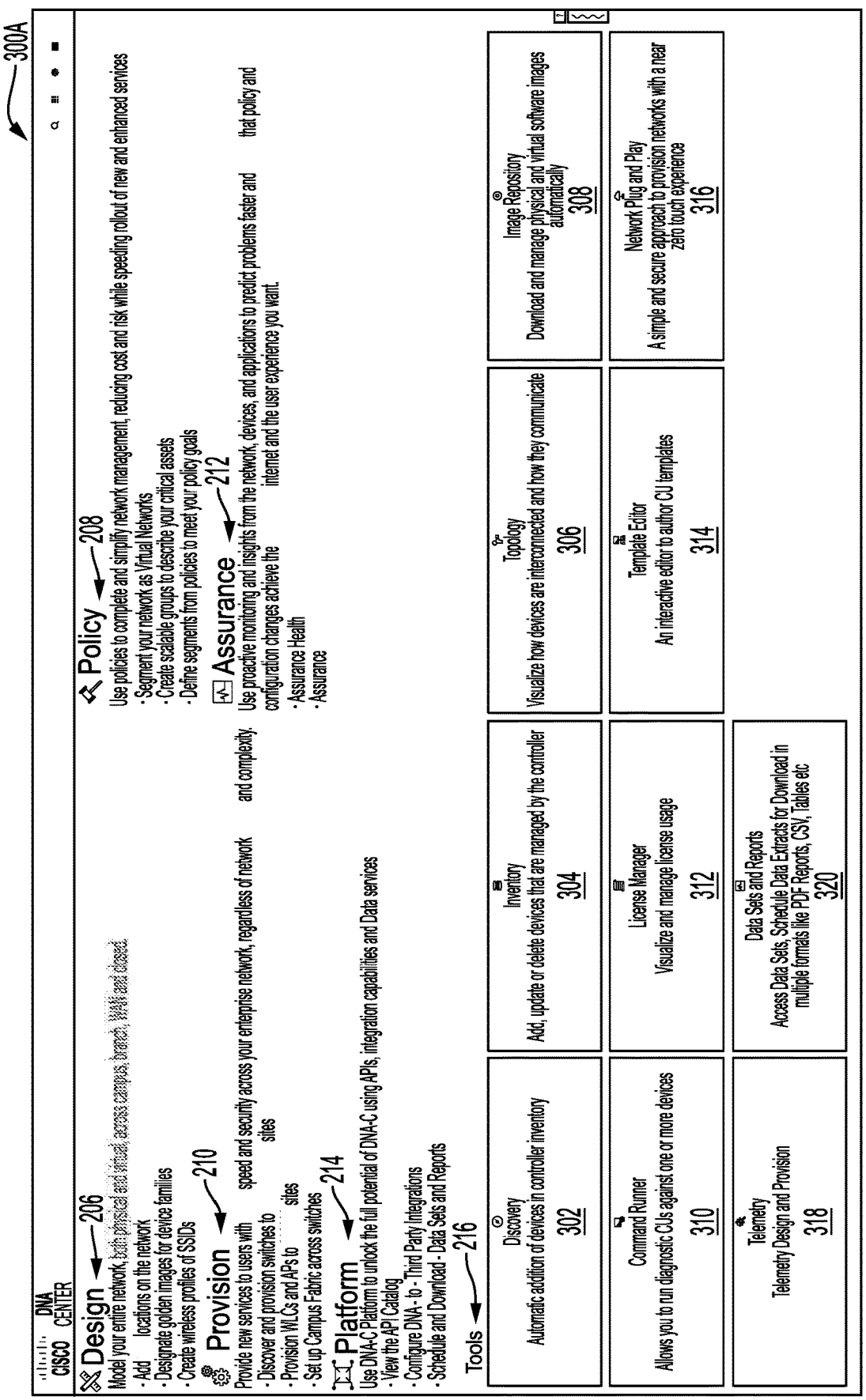
FIGS. 3A-3I illustrate examples of graphical user interfaces for a network management system in accordance with some examples.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

- A network discovery tool 302 for automating the discovery of existing network elements to populate into inventory;
- An inventory management tool 304 for managing the set of physical and virtual network elements;
- A topology tool 306 for visualizing the physical topology of network elements;
- An image repository tool 308 for managing software images for network elements;
- A command runner tool 310 for diagnosing one or more network elements based on a CLI;
- A license manager tool 312 for administering visualizing software license usage in the network;
- A template editor tool 314 for creating and authoring CLI templates associated with network elements in a design profile;
- A network PnP tool 316 for supporting the automated configuration of network elements;
- A telemetry tool 318 for designing a telemetry profile and applying the telemetry profile to network elements; and
- A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
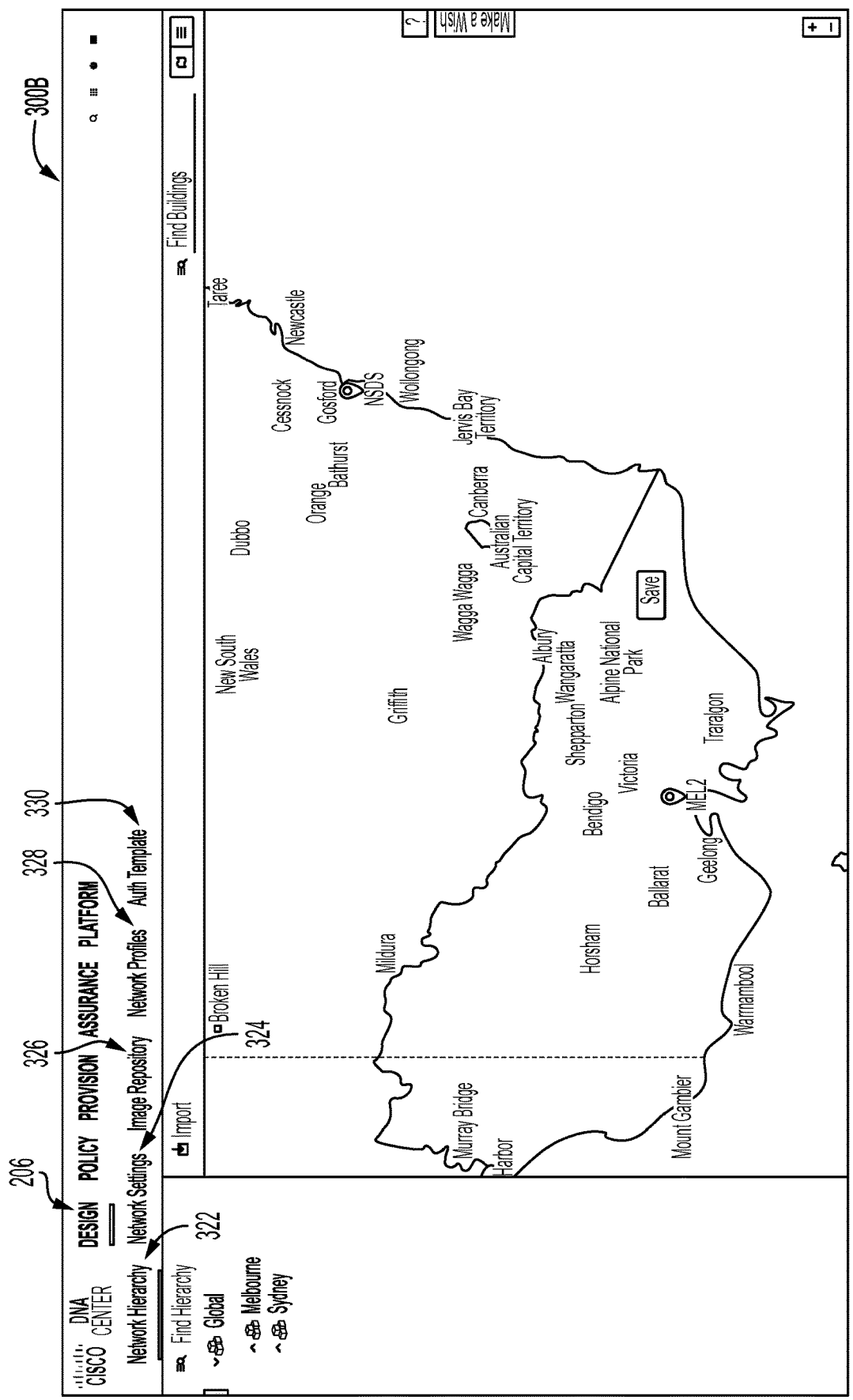

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

- A network hierarchy tool 322 for setting up the geographic location, building, and floor plane details, and associating these with a unique site id;
- A network settings tool 324 for setting up network servers (e.g., Domain Name System (DNS), DHCP, AAA, etc.), device credentials, IP address pools, service provider profiles (e.g., QoS classes for a WAN provider), and wireless settings;
- An image management tool 326 for managing software images and/or maintenance updates, setting version compliance, and downloading and deploying images;
- A network profiles tool 328 for defining LAN, WAN, and WLAN connection profiles (including Service Set Identifiers (SSIDs)); and
- An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
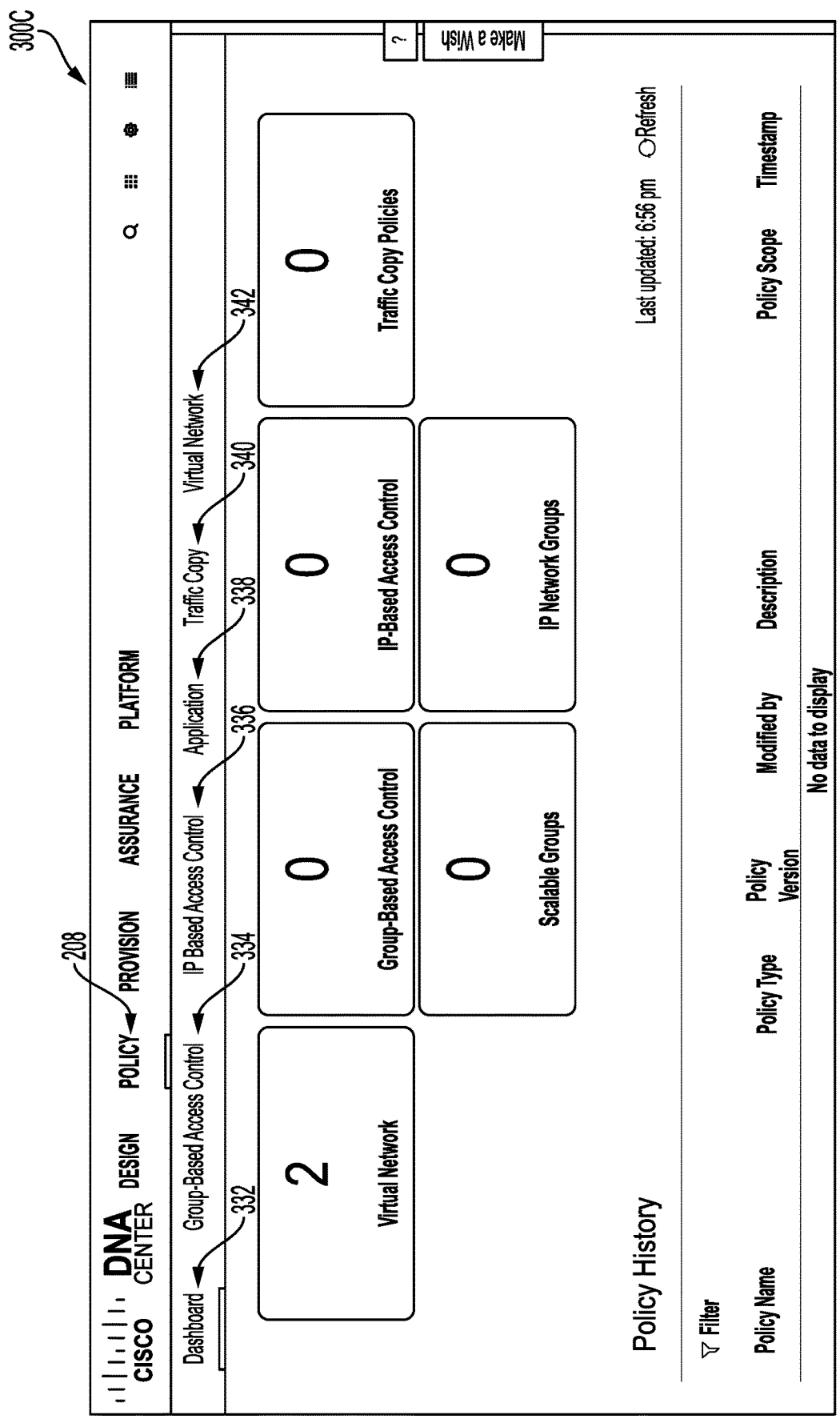

FIG. 3C illustrates a graphical user interface 300C, an example of a landing screen for the policy functions 208. The graphical user interface 300C can include various tools and workflows for defining network policies. In this example, the policy design tools and workflows include:

- A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;
- A group-based access control policies tool 334 for managing group-based access controls or SGACLs. A group-based access control policy can define scalable groups and an access contract (e.g., rules that make up the access control policies, such as permit or deny when traffic matches on the policy);
- An IP-based access control policies tool 336 for managing IP-based access control policies. An IP-based access control can define an IP network group (e.g., IP subnets that share same access control requirements) and an access contract;
- An application policies tool 338 for configuring QoS for application traffic. An application policy can define application sets (e.g., sets of applications that with similar network traffic needs) and a site scope (e.g., the site to which an application policy is defined);
- A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and
- A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
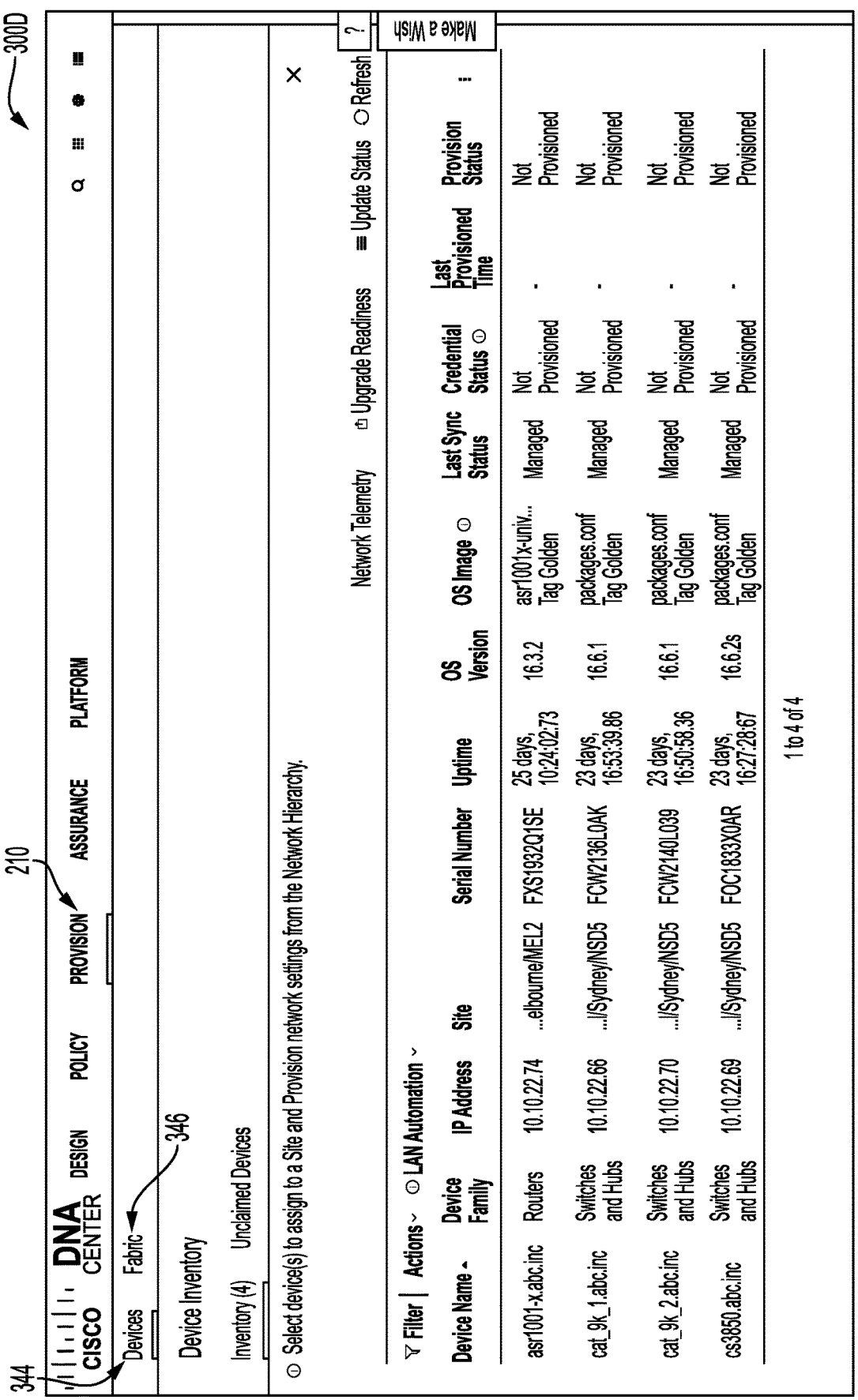

FIG. 3D illustrates a graphical user interface 300D, an example of a landing screen for the provisioning functions 210. The graphical user interface 300D can include various tools and workflows for deploying the network. In this example, the provisioning tools and workflows include:

- A device provisioning tool 344 for assigning devices to the inventory and deploying the required settings and policies, and adding devices to sites; and
- A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
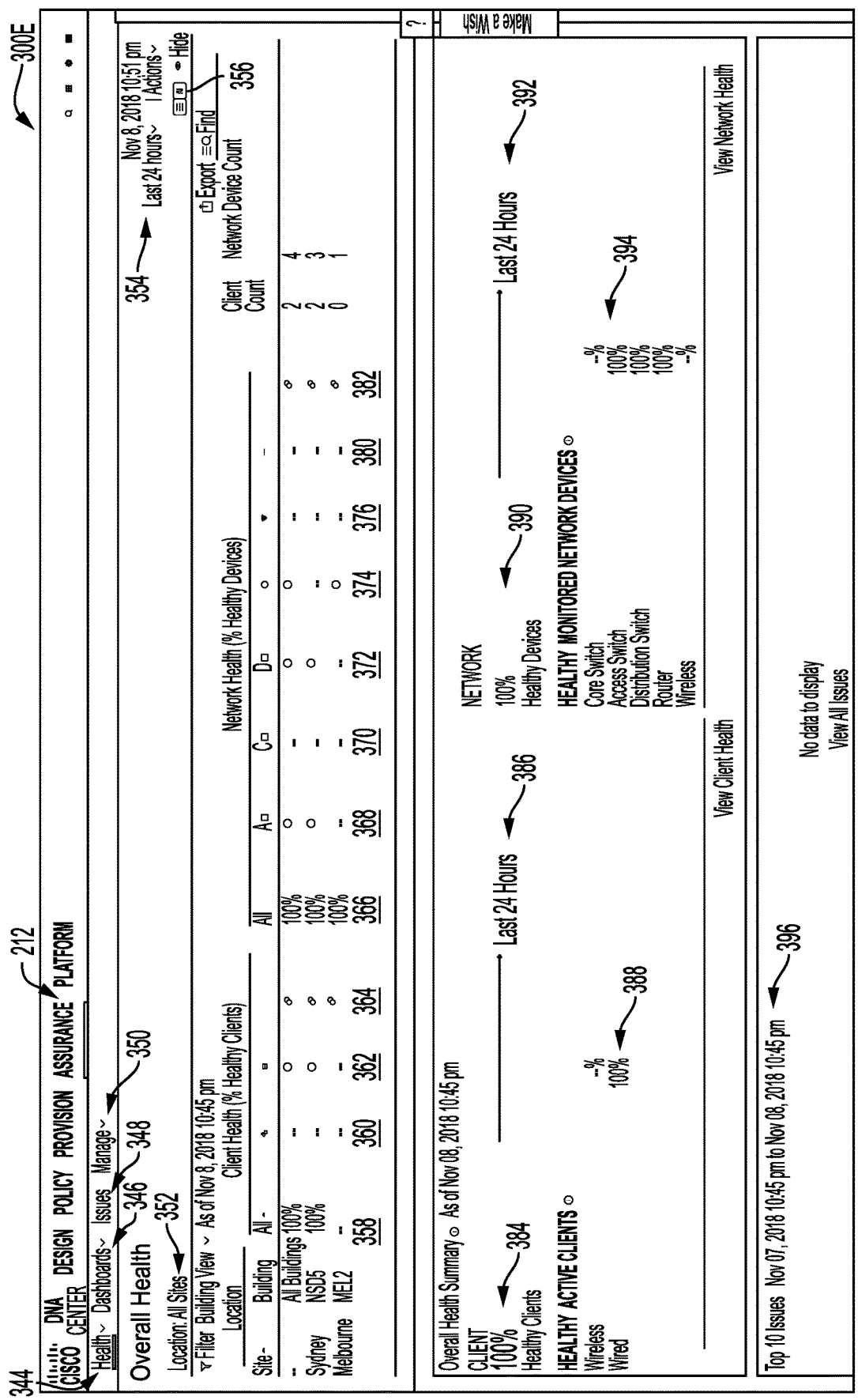

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
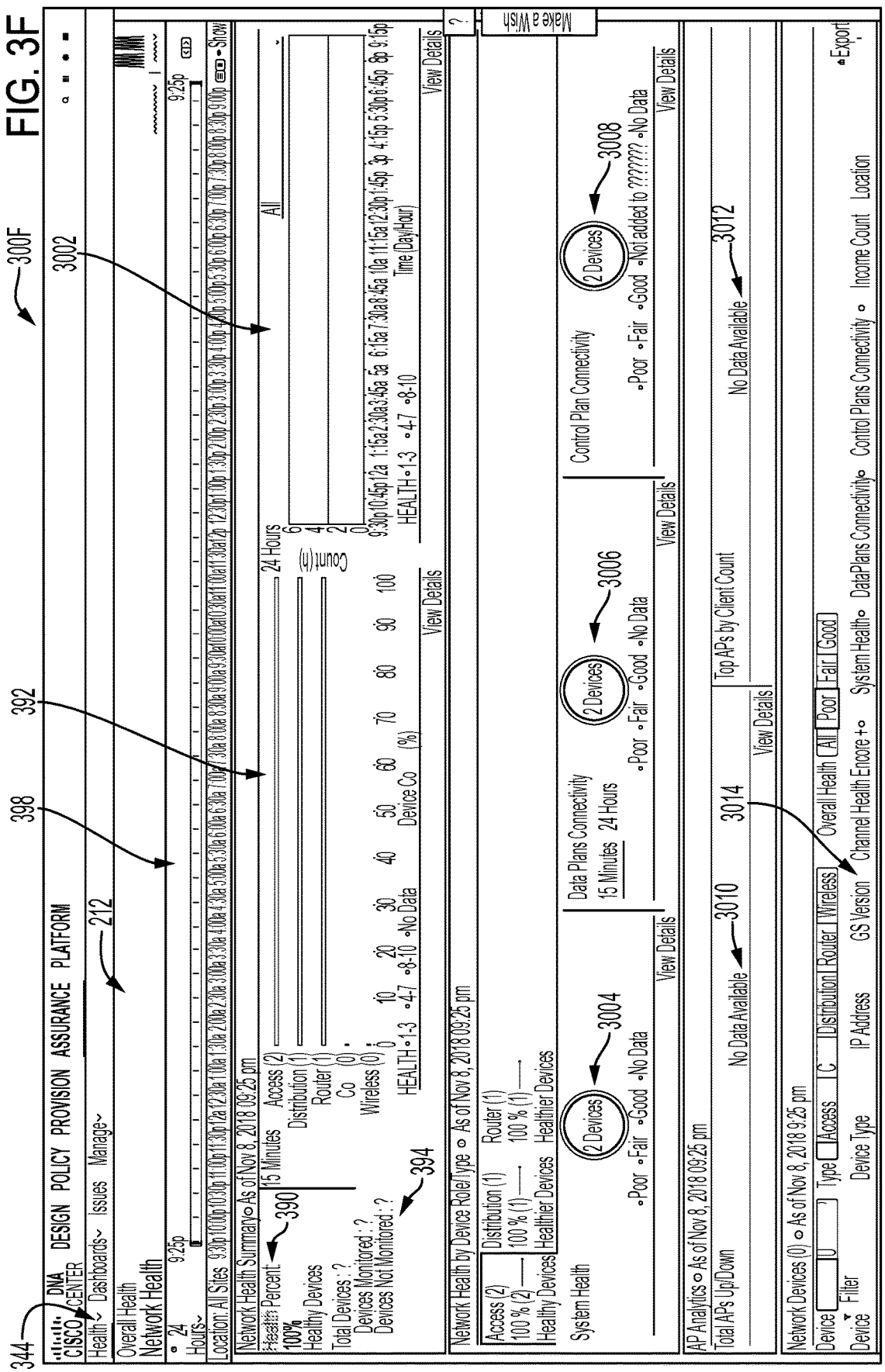

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
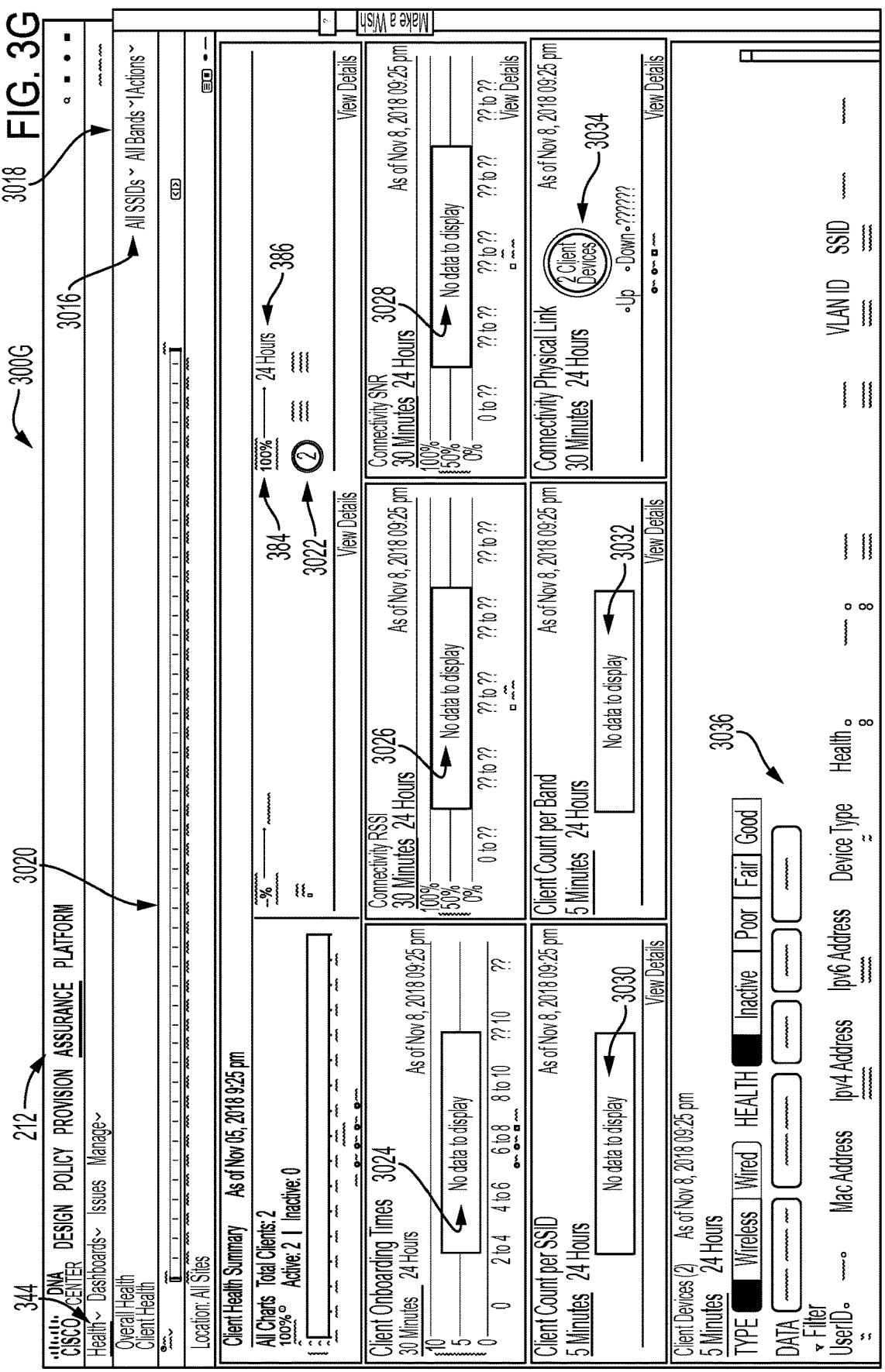

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
   Client onboarding times 3024;
   Received Signal Strength Indications (RSSIs) 3026;
   Connectivity signal-to-noise ratios (SNRs) 3028;
   Client counts per SSID 3030;
   Client counts per band frequency 3032;
   DNS requests and response counters (not shown); and
   Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
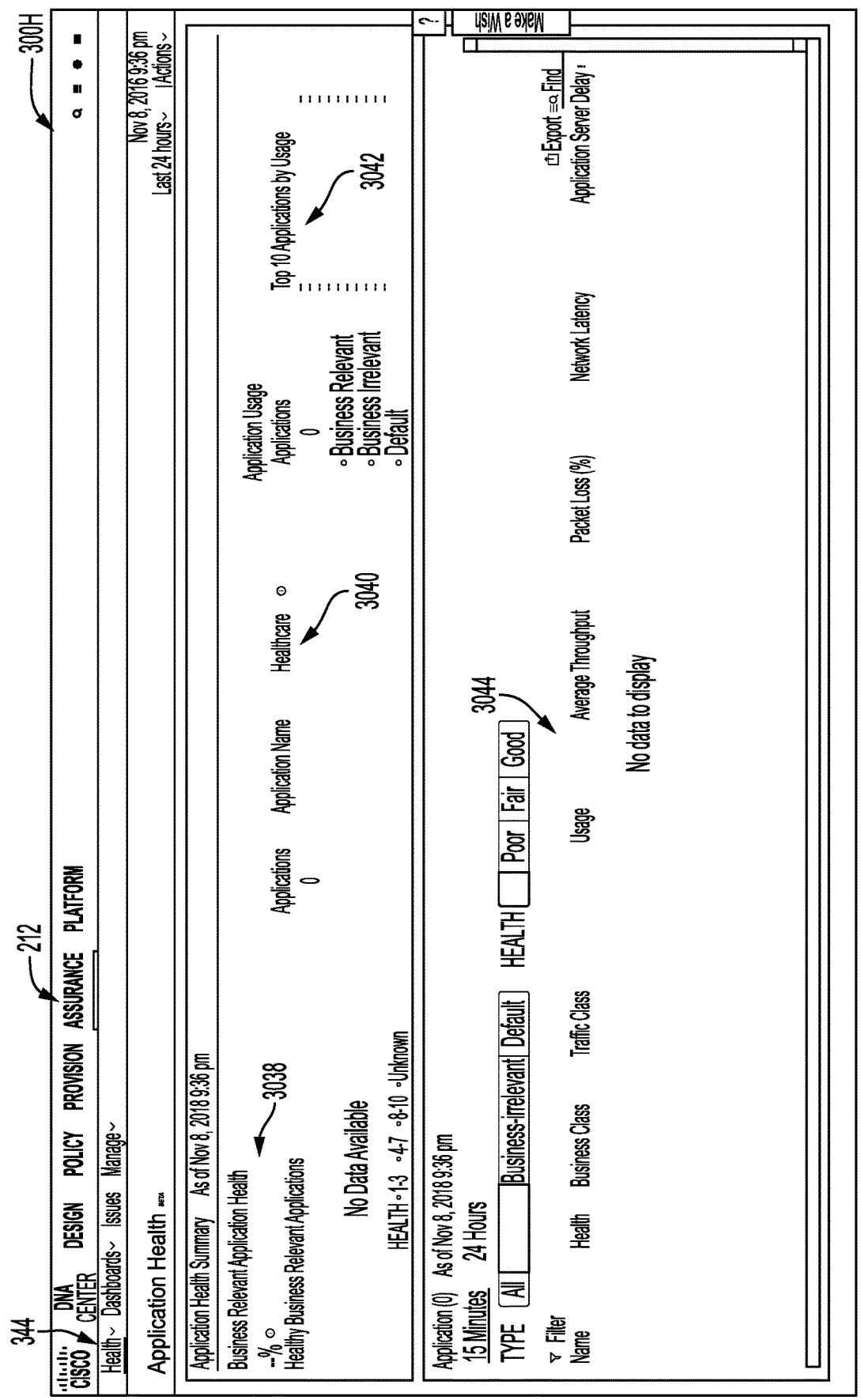

FIG. 3H illustrates a graphical user interface 300H, an example of a screen for an overview of the health of applications, which may be navigated to, for instance, by toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
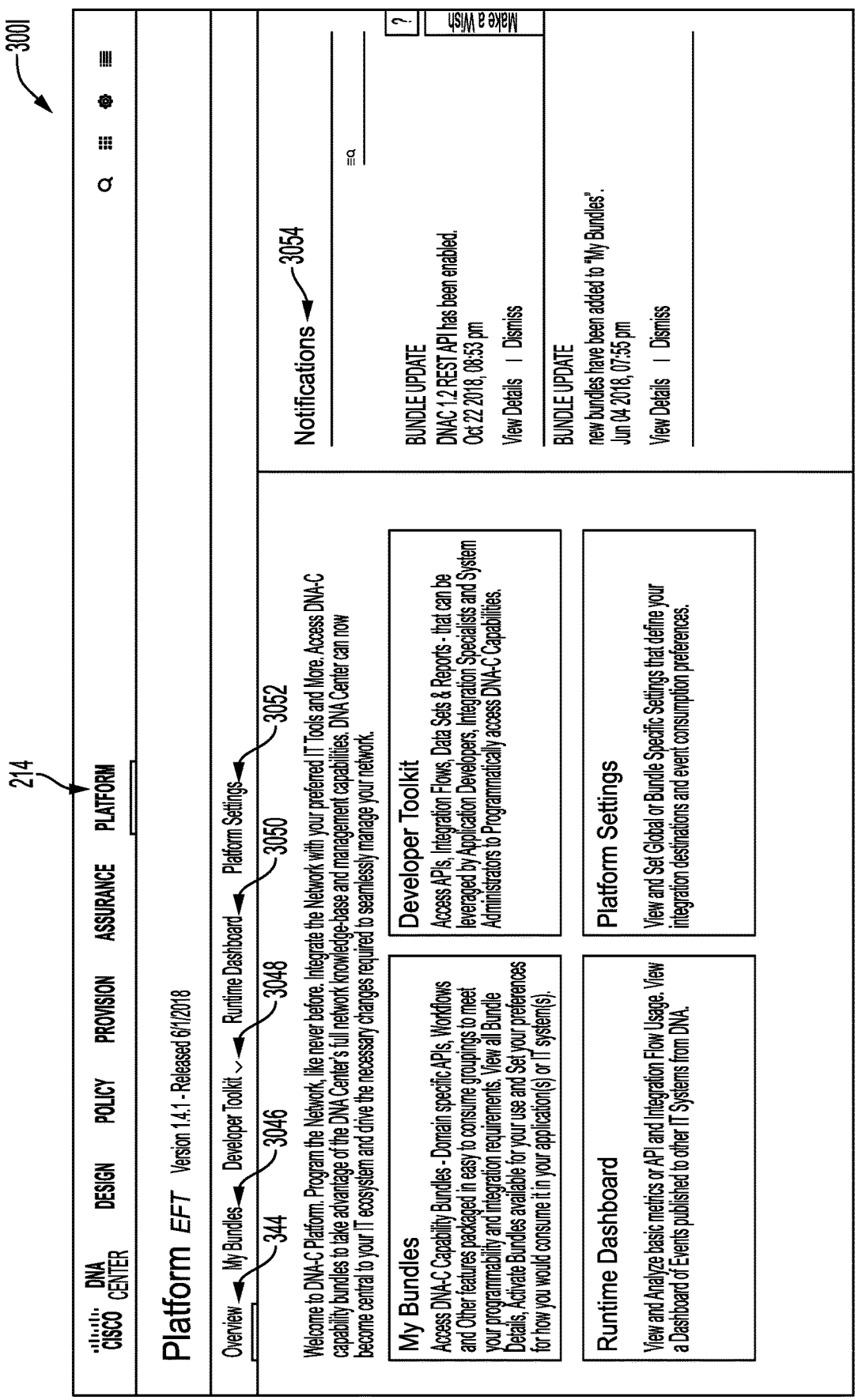

FIG. 3I illustrates an example of a graphical user interface 300I, an example of a landing screen for the platform functions 210. The graphical user interface 300C can include various tools and workflows for integrating with other technology systems. In this example, the platform integration tools and workflows include:
   A bundles tool 3046 for managing packages of domain-specific APIs, workflows, and other features for network programming and platform integration;
   A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
   A runtime dashboard 3050 for viewing and analyzing basic metrics or API and integration flow usage;
   A platform settings tool 3052 to view and set global or bundle-specific settings that define integration destinations and event consumption preferences; and
   A notifications user interface element 3054 for presenting notifications regarding the availability of software updates, security threats, and so forth.

Returning to FIG. 2, the controller layer 220 can include subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can include network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
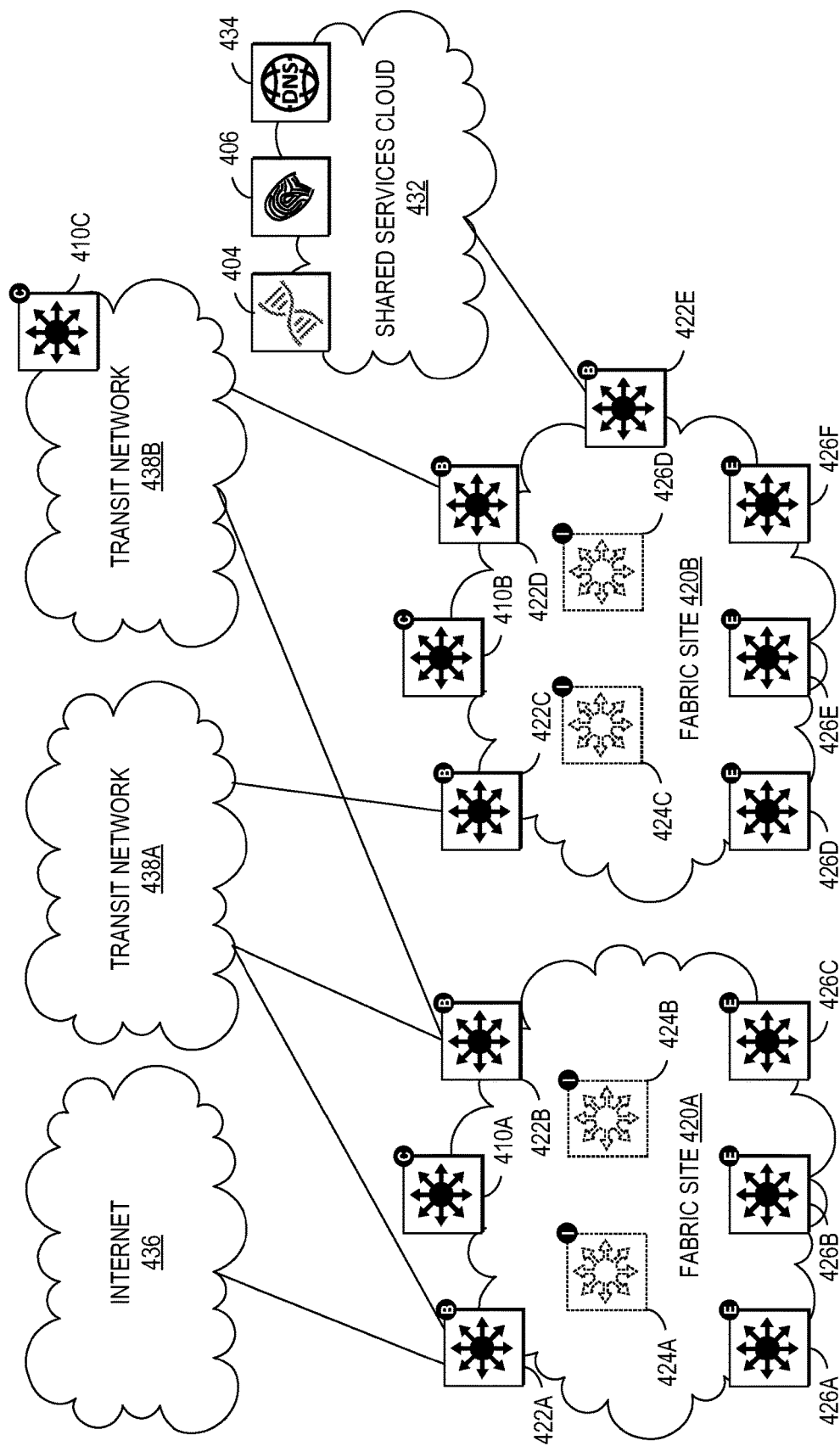
FIG. 4 illustrates an example of a physical topology for a multi-site enterprise network in accordance with some examples.

FIG. 4 illustrates an example of a physical topology for a multi-site enterprise network 400. In this example, the network fabric includes fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be capable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can include one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
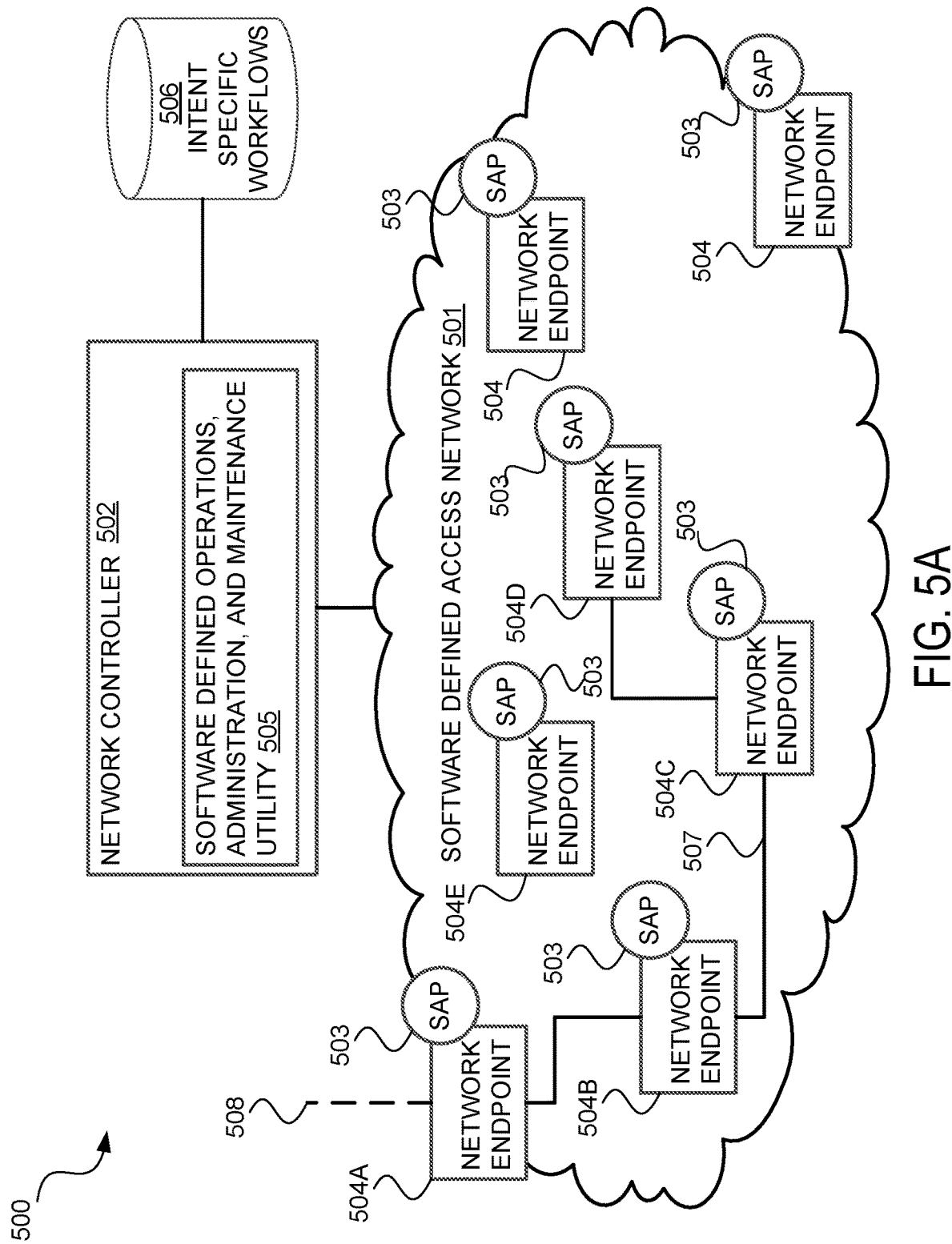
FIG. 5A illustrates an example of a software defined operations, administration, and maintenance system in accordance with some examples.

FIG. 5A depicts a SD-OAM system 500 for retrieving network information for a managed software defined access network 501. In some examples, network 501 may be a private network such as an enterprise network. Further, network 501 may include either or both of physical networks and virtual networks.

Network 501 is managed by a network controller 502 which may perform provisioning, troubleshooting, administration, other processes to maintain stability of and access to network 501. Network controller 502 includes a software defined operations, administration, and maintenance (SD-OAM) utility 505. SD-OAM 505 may coordinate the generation of network information (e.g., health, telemetry, connectivity, and other data from nodes within network 501) and, in some cases, provide the network information to other processes within network controller 502 for managing network 501.

Network 501 includes various network endpoints 504 which, at least in part, make up the overall network. Network 501 may receive an external signal 508, such as from a connecting client device or an external network, which is then routed through the network via forwarding from and to network endpoints 504. In particular, service assurance points (SAPs) 503 may be installed to network endpoints 504 to generate local network information as needed by SD-OAM utility 505 (e.g., as discussed above).

In order to generate network information, particular SAPs 503 may cause respective network endpoints 504 to transmit and receive OAM packets 507 to and from respective immediately neighboring network endpoints 504. Here, for example, a SAP 503 for network endpoint 504B causes the endpoint to interchange OAM packets 507 with network endpoints 504A and 504C. Likewise, an associated SAP 503 causes network endpoint 504C to interchange OAM packets 507 with network endpoints 504B and 504D.

Notably, while network endpoint 504E neighbors network endpoints 504A-D, no OAM packets 507 are exchanged. In some cases, SD-OAM 505 may trigger, via SAPs 503, only particular network endpoints 504 to generate network health information. For example, where SD-OAM 505 is inspecting a single network segment, network endpoints along a route matching that segment, such as a route beginning at network endpoint 504A and extending to network endpoint 504D, may provide health information.

Network health is provided to SD-OAM 505 for analysis and generation of upstream reports. Based on the network health provided, SD-OAM 505 may initiate workflows stored in an intent specific workflow repository 506. In addition, SD-OAM 505 may monitor troubleshooting actions performed on network 501 and update or generate new intent specific workflows based on the monitored actions. Intent specific workflows may include automated operations and/or alerts for detecting and responding to issues identified by SD-OAM 505 analyzing network information provided by SAPs 503.

Figure 5B:
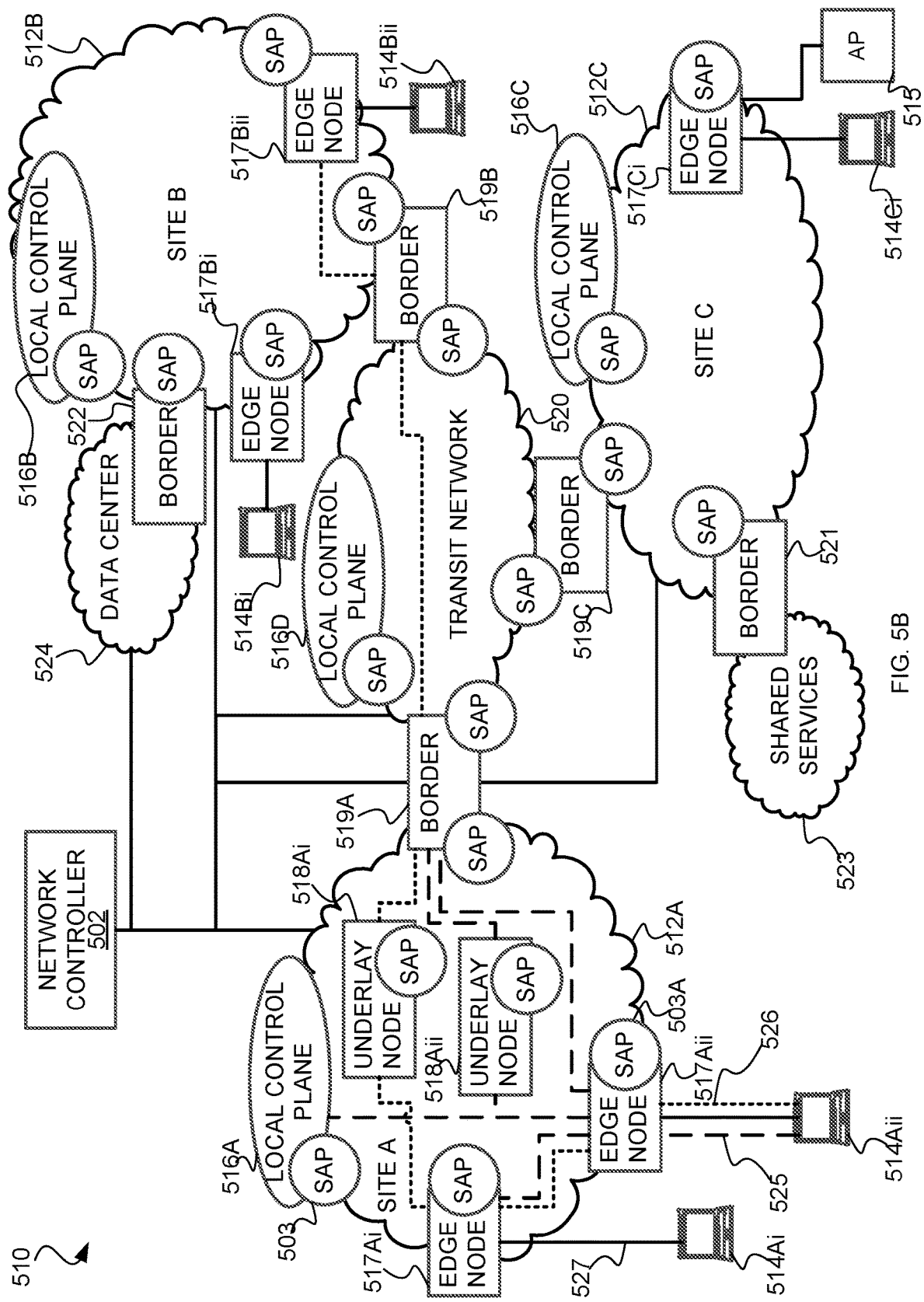
FIG. 5B illustrates an example of a software define operations, administration, and maintenance system over multiple subnets in accordance with some examples.

FIG. 5B depicts a multiple site network 510 that may be managed by network controller 502. In particular, network controller 502 may include SD-OAM 505 (e.g., as discussed in reference to FIG. 5A above) for operating, administrating, and maintaining multiple site network 510. Network controller 502 manages each site 512A-C as well as a transit network 520 that make up multiple site network 510. Network traffic, for general communications and/or control messages, flow through the various sites 512A-C, transit network 520, and network controller 502, as well as to a data center 524, as indicated by a solid black line 527.

Each site 512A-C includes a respective local control plane 516A-C for managing routing policies and traffic flow throughout the respective site 512A-C. In addition, transit network 520 includes a respective local control plane 516D for managing traffic flow and routing policies. Site 512A is adjoined to transit network 520 via a border node 519A, site 512B is adjoined to transit network 520 via a border node 519B, and site 512C is adjoined to transit network 520 via a border node 519C.

Each site may include a plurality of underlay nodes providing transit for network traffic internally through the site, border nodes providing transit of network traffic to adjoined sites, networks, and/or external services, and edge nodes providing ingress and egress points for network traffic through the site and related to, for example, a networked user device. Here, each node as well as local control planes 516A-D are associated with respective SAPs 503. In some examples, SAPs 503 are installed on a shared physical device with respective nodes. In some examples, SAPs 503 may be installed on a virtual machine associated with a respective node.

With respect to site 512A, underlay nodes 518Ai-ii provide internal routing of network traffic for site 512A according to policies provided by local control plane 516A. Edge nodes 517Ai-ii provide ingress and egress points to network traffic for site 512A. In particular, a user device 514Ai interacts with multiple site network 510 via edge node 517Ai and a user device 514Aii interacts via edge node 517Aii.

With respect to site 512B, edge nodes 517Bi-ii provide ingress and egress points to multiple site network 510 for respective user devices 514Bi-ii. Further, a border node 522 adjoins site 512B to data center 524. For example, traffic for user devices accessing data center 524 may route through site 512B regardless of through which edge node they attach to multiple site network 510 (e.g., edge node 517Bii, edge node 517Aii, etc.).

With respect to site 512C, an edge node 517Ci provides ingress and egress to multiple site network 510 for a user device 514Ci as well as an access point (AP) 515. AP 515 may provide additional access for user devices. For example, AP 515 may be a wireless router, radio receiver, etc. A border node 521 adjoins site 512C to a shared services system 523. Shared services system 523 can include, for example and without imputing limitation, authenticating services, password management services, identity services, and the like. As a result, any user client (e.g., user device 514Ai) wishing to authenticate network access must send packets traversing site 512C.

Upon request from network controller 502, SAPs 503 attached to the various nodes in multiple site network 510 may send OAM packets to nodes neighboring respective installation nodes. Accordingly, SAPs 503 can then determine local network information (e.g., latency, ping, response times, etc.) to send back to network controller 502 for further aggregation, analysis, workflow activation, and/or reporting.

Here, for example, network controller 502 requests local network information from 503A installed at edge node 517Aii. SAP 503A then causes edge node 517Aii to transmit OAM packets 525 (identified by the long dashed line) to user device 514Aii, edge node 517Ai, local control plane 516A (e.g., a hosting server or virtual device), underlay node 518Aii, and border node 519A. SAP 503A may then convert any non-standard (e.g., unique to a particular device, such as for user device 514Aii) response information into a standardized format and provide local network information to network controller 502 in a standard format packet.

Further, as discussed above, network controller 502 may request information for a traversal across a plurality of sites 512A-C. Here, SAPs attached to multiple devices produce responsive OAM packets 526 (identified by the short dashed line) to neighboring nodes to generate segments for a network traversal from user device 514Aii attached to site 512A to user device 514Bii attached to site 512B. This may be done to identify and/or troubleshoot inter-site communications such as, for example, a lagged internal video conference or the like. The generated segments can then be aggregated by network controller 502 in order to generate a cohesive picture of network information along the traversal path of OAM packets 526. As a result, OAM operations can be performed across multiple site network 510 without overwhelming network traffic with OAM packets or only being able to receive minimal or infrequent OAM updates.

Figure 5C:
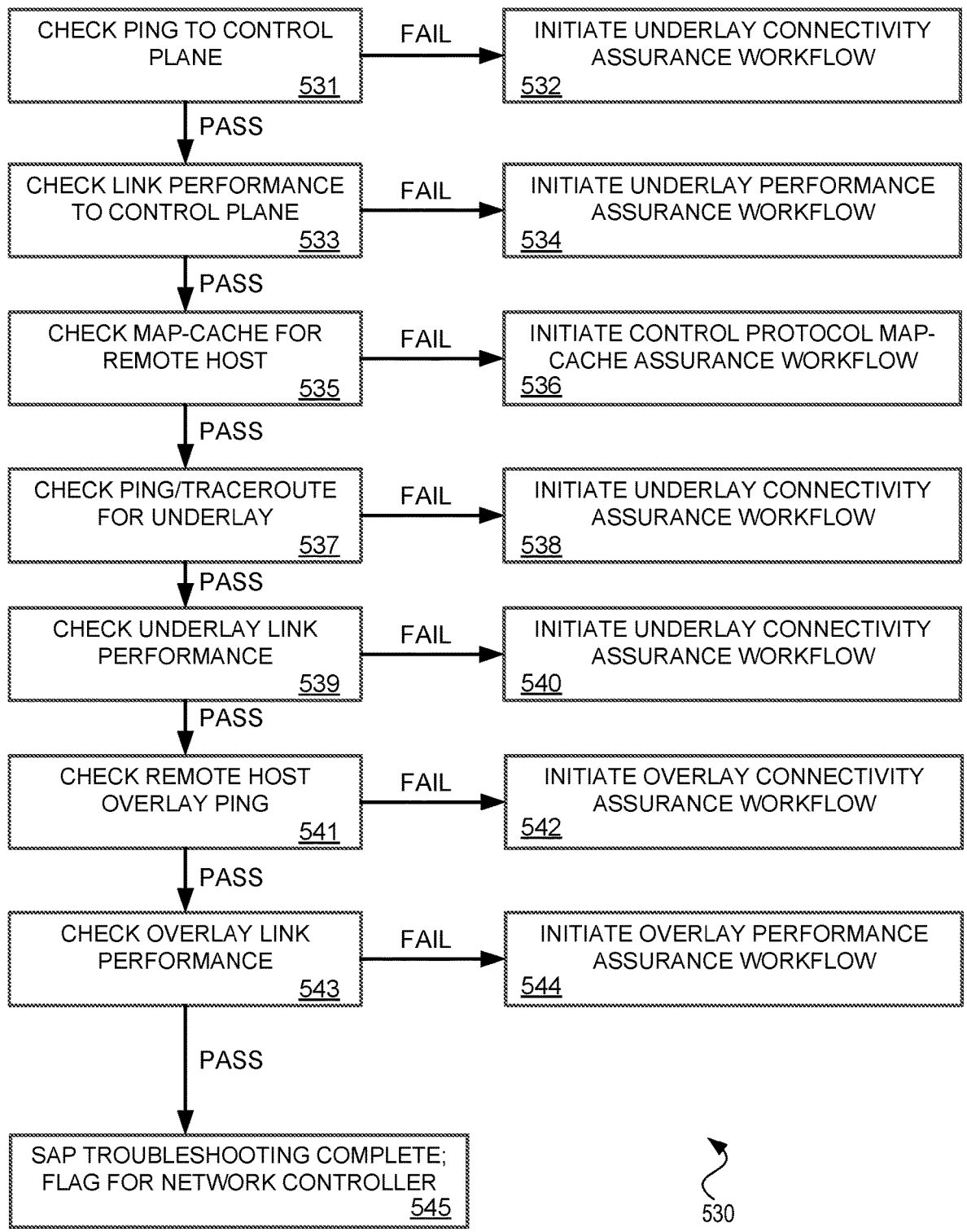
FIG. 5C illustrates an example of a software defined service assurance point workflow for monitoring, identifying, and resolving issues on a node in accordance with some examples.

FIG. 5C depicts a hierarchical workflow 530 substantially similar to examples discussed above. Hierarchical workflow 530 may be stored on intent specific workflow repository 506. In some examples, network controller 502 and/or software defined operations, administration, and maintenance utility 505 may execute, at least in part, workflow 530. For example, based on network information provided to network controller 502 by SAPs 503 throughout software defined access network 501, hierarchical workflow 530 may be initiated and performed by network controller 502 and SAPs 503.

Hierarchical workflow 530 includes a series of bifurcating tests. While pass/fail tests are depicted here, it is understood that some workflows may include categorical flows (e.g., three or more paths from a particular test). In some examples, tests may trigger a halt to the workflow and/or initiation of a new workflow.

At block 531, at the top of hierarchical workflow 530, a node ping, or response latency, to a local control plane (e.g., local control planes 516A-D, etc.) is determined. The ping may be compared to a threshold value provided either at an earlier point in time or based on another service or process (e.g., retrieved via an internal API call, etc.). If the ping is below a certain threshold, then at block 532 an underlay connectivity assurance workflow is triggered.

If the ping is above the threshold, then hierarchical workflow 530 may proceed on to block 533. At block 533, performance of a link to the control plane is check. For example, a respective SAP 530 may check link stability, latency, etc. If the link performance is fails performance testing, then an underlay performance assurance workflow may be initiated at block 534.

In particular, and with regards to blocks 531 and 533, the respective checks may be performed by retrieving information directly from SAPs installed to the respective control plane (e.g., local control planes 516A-D, etc.). In effect, a SD-OAM process within the network controller may integrate OAM access and monitoring functionality directly within the control plane in order to execute hierarchical workflow 530 (e.g., to perform self-correction of network issues, etc.).

If link performance is satisfactory (e.g., passes performance testing), then hierarchical workflow 530 may proceed to block 535. At block 535, a map-cache is checked for a remote host (e.g., client device 514Ai-ii, etc.). In the fail state, a control protocol map-cache assurance workflow may be triggered at block 536. In the pass state, hierarchical workflow may proceed to block 537.

At block 537, ping and/or traceroute for an underlay may be performed and checked for falling within certain thresholds. For example, a respective SAP 503 may determine a ping value for neighboring nodes or generate an entire traceroute across a network (e.g., via OAM packets 526 discussed above). If the ping or traceroute fails, based on the certain thresholds, an underlay connectivity workflow can be initiated at block 538. Otherwise (e.g., the ping or traceroute falls within the certain thresholds), hierarchical workflow 530 may proceed to block 539.

At block 539, underlay link performance is checked by retrieving network information from one or more SAPs within the network. Underlay link performance may include stability, throughput, accuracy, etc. between various nodes within the network underlay. If the underlay link performance is below particular thresholds (e.g., the check fails), then an underlay connectivity workflow may be initiated at block 544. In some examples, underlay connectivity workflows at blocks 542 and 544 may be the same. In other examples, underlay connectivity workflows at blocks 542 and 544 may be altogether different workflows designed to rectify underlay connectivity issues via different processes. Nevertheless, if the check at block 539 passes, hierarchical workflow 530 can instead proceed to block 541.

At block 541, overlay ping for a remote host (e.g., client device 514Ai-ii, etc.) can be checked. For example, where workflows have been triggered due to connectivity issues arising in a client communication session, hierarchical workflow 530 may perform a check to measure the ping from the client to the network or across the network to another (e.g., participating) client device. If the check at block 541 fails, an overlay connectivity assurance workflow can be initiated at block 542. If the check at block 541 passes, hierarchical workflow 530 may proceed to block 543.

At block 543, overlay link performance may be checked. For example, network information for edge and border nodes may retrieved by SAPs 503 and processed for stability, latency, accuracy, etc. If link performance fails to comply to a certain threshold, overlay performance assurance workflows can be initiated at block 544. Otherwise, hierarchical workflow 530 may proceed to block 545.

At block 545, SAP troubleshooting may be labeled as complete and the network controller can be notified. In some cases, the network controller may then notify a network administrator to manually troubleshoot. In other examples, a respective issue may be labeled as having completed troubleshooting or automatically trigger another workflow to further isolate or autocorrect the issue if possible.

Figure 5D:
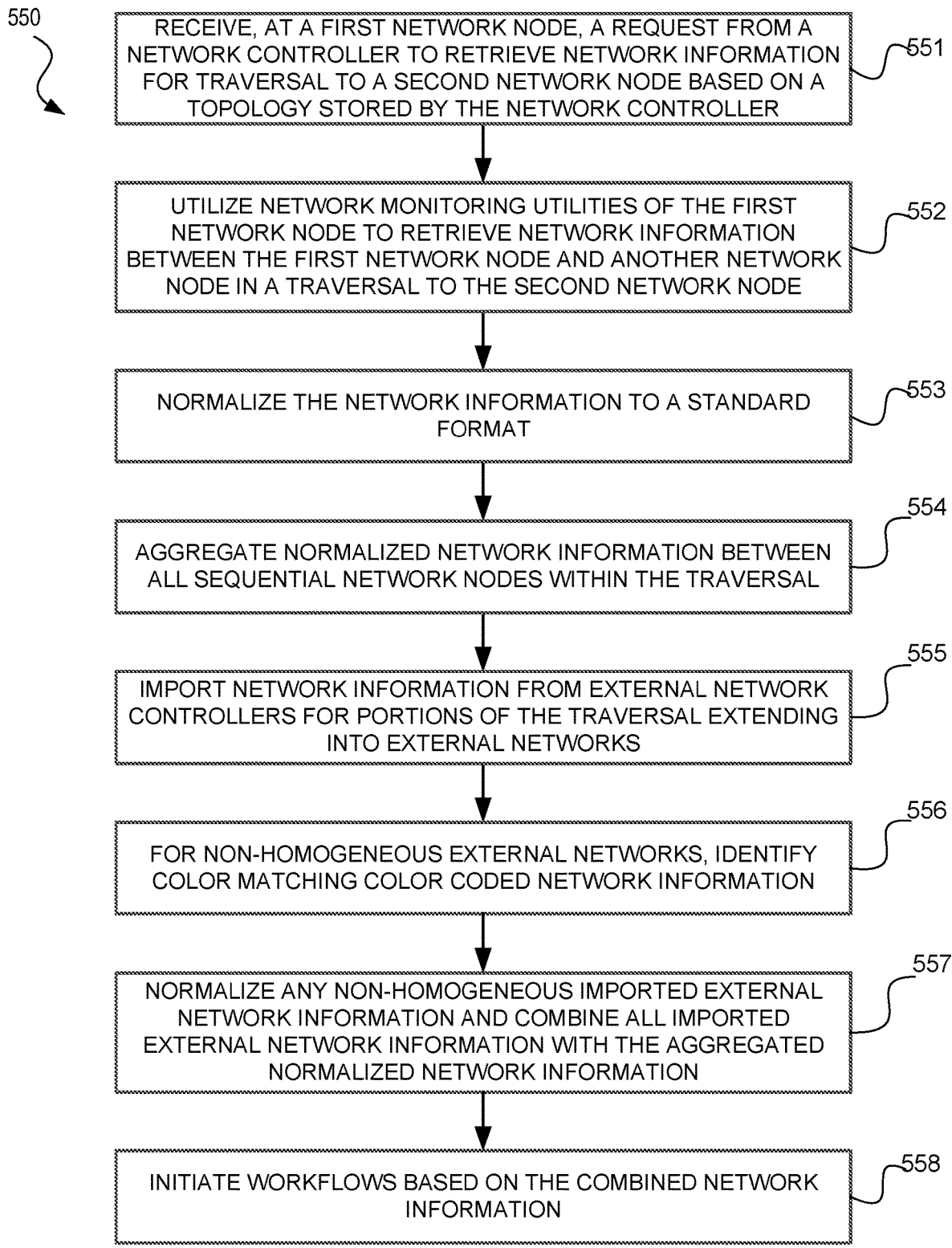
FIG. 5D illustrates a method for monitoring, identifying, and resolving issues in a network in accordance with some examples.

FIG. 5D illustrates a method 550 for detecting and resolving issues in a network such as, for example, software defined network 500. For example, method 550 may be executed by a network controller 502 and using SAPs 503 distributed throughout software defined network 500.

At step 551, a first network node receives a request from a network controller (e.g., network controller 502). The request may be for network information for traversal to a second network node based on a stored topology. For example, a SAP 503 installed on the first network node may receive the request and cause the first network node to transmit an OAM packet to the second network node.

At step 552, network monitoring utilities of the first network node are utilized to retrieve network information between the first network node and the second network node. The network information may be retrieved via, for example, OAM packets traversing between the first and second network nodes. Additionally, the first network node may include native monitoring and analytics processes for generating network information based on the transmitted OAM packets.

At step 553, the network information is normalized to a standardized format. In some examples, the standardized format may be a predetermined JSON structure or the like. Normalization may include, for example and without imputing limitation, scaling, translating, transforming, and other operations to conform the network information into a format interpretable by various processes of the network controller. In some examples, normalization may be done at the first network node. In other examples, a normalization process may be performed by the network controller.

At step 554, normalized network information from across the network such as, for example, following a path of traversal between multiple nodes to produce a route, is aggregated. In some examples, the network controller may receive individual route segments and perform an aggregation and combination process to generate a cohesive route and associated network information along the route.

At step 555, network information from external networks are imported via communication with respective network controllers. In some examples, external network controllers may perform a substantially similar method to method 550, and steps 551-554 in particular, to generate respective network information.

At step 556, color coded network information from non-homogeneous networks is identified. At step 557, the color coded network information is normalized and, using the color codes, the external network information (including nonhomogeneous) is combined with the aggregated normalized network information.

At step 558, workflows can be initiated based on the combined network information. For example, hierarchical workflow 530 can be initiated as a first workflow. Based on checks within workflow 530, additional workflows (e.g., nested workflows) may be subsequently or alternatively initiated.

Figure 6A:
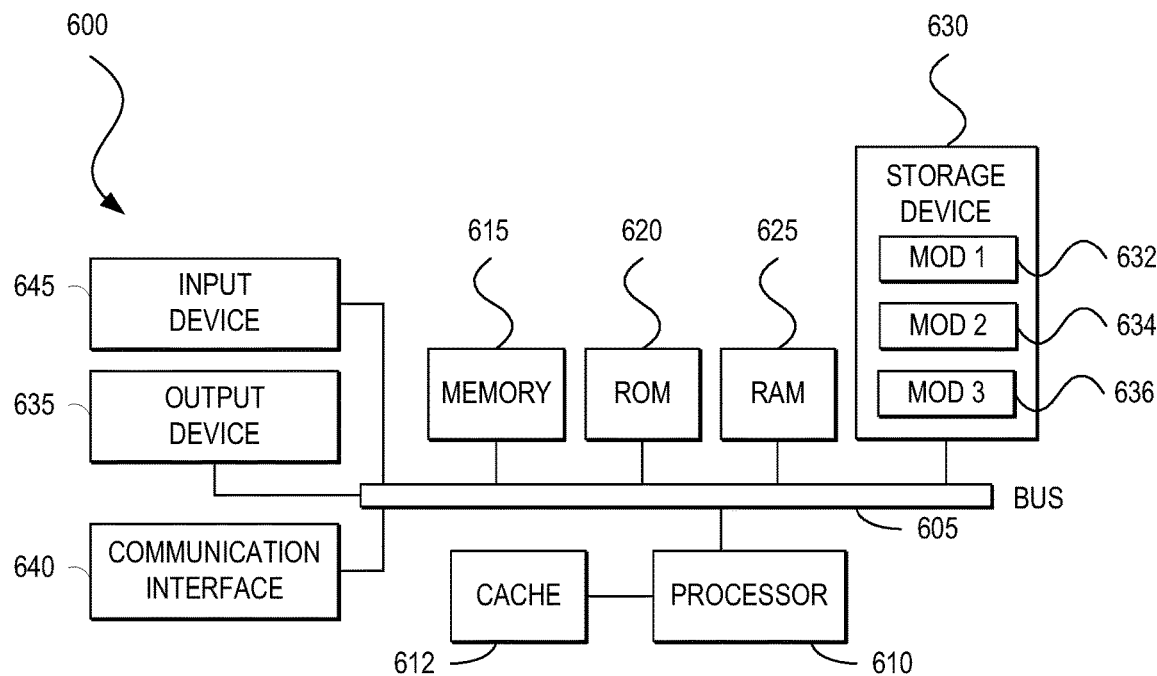
FIGS. 6A and 6B illustrate examples of systems in accordance with some examples.
Figure 6B:
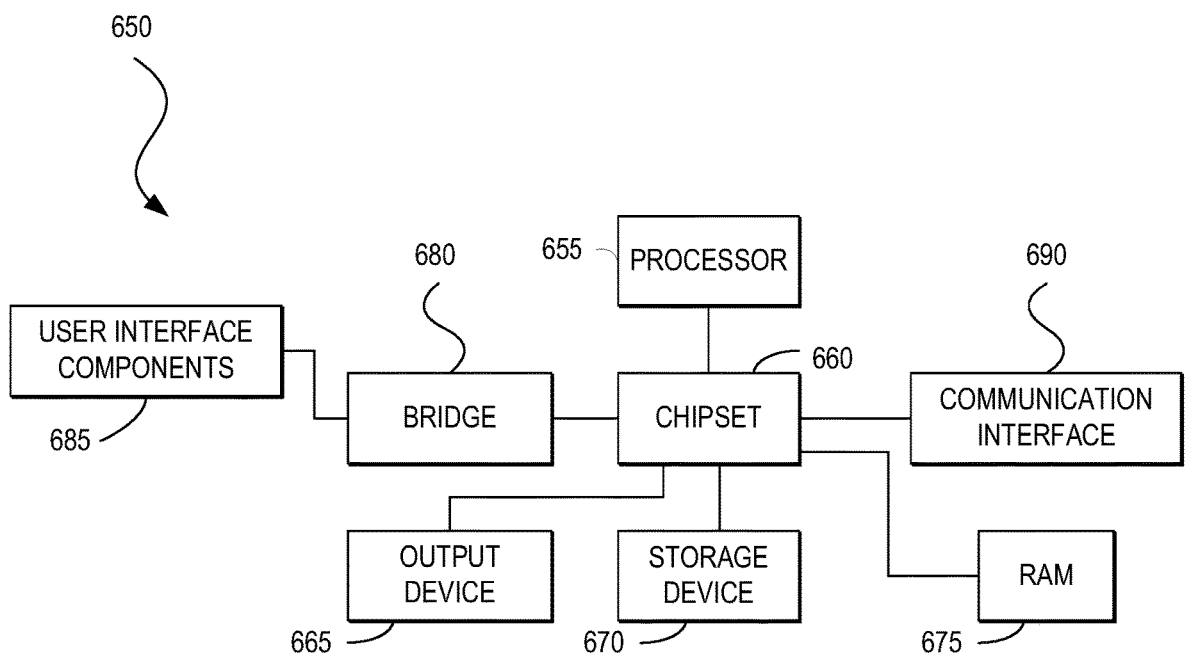

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Examples are provided herein to enhance understanding of the disclosure. A specific set of statements are provided as follows:

Statement 1: A computer-implemented method includes receiving, at a controller, node analytics from a service assurance point (SAP), the node analytics including performance information of a node within an access network, triggering, by the controller and based on the node analytics, an intent specific workflow at a workflow application; and monitoring, by the controller, the node by receiving additional node analytics.

Statement 2: A method according Statement 1 further includes identifying a first link between the node and a second node, identifying a second link between the second node and a third node, and generating, by the controller, aggregated path information based on the node analytics, wherein the received node analytics further includes performance information of the first link and the second link.

Statement 3: A method according to any of the preceding Statements includes the controller including a software defined operations, administration, and maintenance (SD-OAM) process, the SD-OAM process communicating with the SAP.

Statement 4: A method according to any of the preceding Statements further includes updating the workflow application with an outcome of the intent specific workflow, the workflow application algorithmically learning from the outcome.

Statement 5: A method according to any of the preceding Statements further includes identifying, by the controller, the node for which to receive node analytics based on a topology of the access network.

Statement 6: A method according to any of the preceding Statements further includes receiving additional node analytics from a second controller, the second controller for a second access network.

Statement 7: A method according to Statement 6 includes the node analytics including local correlation information generated by processes on the node.

Statement 8: A method according to Statements 6 or 7 includes the additional node analytics being color coded and further includes matching the additional node analytics to the node analytics from the SAP based on the color code.

Statement 9: A method according to any of the preceding Statements further includes converting different node analytic formats into a shared standard for the controller to interpret.

Statement 10: A system includes one or more processors, and a memory storing instructions including receive, at a controller, node analytics from a service assurance point (SAP), the node analytics including performance information of a node within an access network, trigger, based on the node analytics, an intent specific workflow at a workflow application, and monitor the node by receiving additional node analytics.

Statement 11: A non-transitory computer readable medium includes instructions that, when executed by one or more processors, cause the one or more processors to receive, at a controller, node analytics from a service assurance point (SAP), the node analytics including performance information of a node within an access network, trigger, based on the node analytics, an intent specific workflow at a workflow application, and monitor the node by receiving additional node analytics.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a controller, node analytics from at least one service assurance point (SAP) connected to a plurality of nodes, the node analytics comprising performance information of the plurality of nodes, wherein the controller includes a software defined operations, administration, and maintenance (SD-OAM) process for at least in part communicating with the SAP;
determining, based on the node analytics, whether there are issues with any of the plurality of nodes;
in response to determining at least one issue with a node of the plurality of nodes, initiating, by the controller via the SD-OAM process a first hierarchical intent specific workflow, wherein the first hierarchical intent specific workflow is configured to detect and resolve the at least one issue of the node;

monitoring, by the controller, at least the node by receiving additional node analytics; and in response to determining at least one additional issue from the additional node analytics, triggering, by the controller, a second hierarchical intent specific workflow, wherein the first and the second hierarchical intent specific workflows are triggered according to a hierarchy and the first hierarchical intent specific workflow is above the second hierarchical intent specific workflows in the hierarchy.

2. The method of claim 1, further comprising:

identifying a first link between the node and a second node;

identifying a second link between the second node and a third node; and generating, by the controller, aggregated path information based on the node analytics;

wherein the received node analytics further comprise performance information of the first link and the second link.

3. The method of claim 1, further comprising:

updating the SD-OAM process with an outcome of the first hierarchy intent specific workflow, the SD-OAM process algorithmically learning from the outcome.

4. The method of claim 1, further comprising identifying, by the controller, the plurality of nodes for which to receive node analytics based on a topology of the access network.

5. The method of claim 1, further comprising receiving second node analytics from a second controller, the second controller for a second access network.

6. The method of claim 1, wherein the node analytics comprise local correlation information generated by processes on the node.

7. The method of claim 5, wherein the second node analytics are color coded and wherein the method further comprises matching the second node analytics to the node analytics from the SAP based on the color code.

8. The method of claim 1, further comprising converting different node analytic formats into a shared standard for the controller to interpret.

9. The method of claim 1, further comprising:

triggering, by the controller, the plurality of nodes in a network segment of an access network to provide the node analytics.

10. A system comprising:

one or more processors; and a memory storing instructions comprising:

receive node analytics from at least one service assurance point (SAP) connected to a plurality of nodes, the node analytics comprising performance information of the plurality of nodes, wherein a software defined operations, administration, and maintenance (SD-OAM) process is used at least in part communicating with the SAP;

determine, based on the node analytics, whether there are issues with any of the plurality of nodes;

in response to determining at least one issue with a node of the plurality of nodes, initiate, via the SD-OAM process, a first hierarchical intent specific workflow, wherein the first hierarchical intent specific workflow is configured to detect and resolve the at least one issue of the node;

monitor at least the node by receiving additional node analytics; and in response to determining at least one additional issue from the additional node analytics, trigger a second hierarchical intent specific workflow, wherein the first and the second hierarchical intent specific workflows are triggered according to a hierarchy and the first hierarchical intent specific workflow is above the second hierarchical intent specific workflows in the hierarchy.

11. The system of claim 10, wherein the instructions further comprise:

identify a first link between the node and a second node;

identify a second link between the second node and a third node; and generate aggregated path information based on the node analytics;

wherein the received node analytics further comprise performance information of the first link and the second link.

12. The system of claim 10, wherein the instructions further comprise:

update the SD-OAM process with an outcome of the first hierarchical intent specific workflow, the SD-OAM process algorithmically learning from the outcome.

13. The system of claim 10, wherein the instructions further comprise identify the plurality of nodes for which to receive node analytics based on a topology of the access network.

14. The system of claim 10, wherein the instructions further comprise receive second node analytics from a second controller, the second controller for a second access network.

15. The system of claim 14, wherein the second node analytics are color coded and wherein the method further comprises matching the second node analytics to the node analytics from the SAP based on the color code.

16. The system of claim 10, wherein the instructions further comprise:

trigger the plurality of nodes in a network segment of an access network to provide the node analytics.

17. A non-transitory computer readable medium comprising instructions that, when executed by one or more processors, cause the one or more processors to:

receive node analytics from at least one service assurance point (SAP) connected to a plurality of nodes, the node analytics comprising performance information of the plurality of nodes, wherein a software defined operations, administration, and maintenance (SD-OAM) process for at least in part communicating with the SAP;

determine, based on the node analytics, whether there are issues with any of the plurality of nodes;

in response to determining at least one issue with a node of the plurality of nodes, initiate, via the SD-OAM process, a first hierarchical intent specific workflow, wherein the first hierarchical intent specific workflow is configured to detect and resolve the at least one issue of the node;

monitor at least the node by receiving additional node analytics; and in response to determining at least one additional issue from the additional node analytics, trigger a second hierarchical intent specific workflow, wherein the first and the second hierarchical intent specific workflows are triggered according to a hierarchy and the first hierarchical intent specific workflow is above the second hierarchical intent specific workflows in the hierarchy.

18. The non-transitory computer readable medium of claim 17, further comprising instructions to:

identify a first link between the node and a second node;

identify a second link between the second node and a third node; and generate aggregated path information based on the node analytics;
wherein the received node analytics further comprise performance information of the first link and the second link.

19. The non-transitory computer readable medium of claim 17, further comprising instructions to:
update the SD-OAM process with an outcome of the intent specific workflow, the SD-OAM process algorithmically learning from the outcome.

20. The non-transitory computer readable medium of claim 17, further comprising instructions to identify the plurality of nodes for which to receive node analytics based on a topology of the access network.

* * * * *